(12) United States Patent
Shimezawa et al.

(10) Patent No.: US 9,681,322 B2
(45) Date of Patent: Jun. 13, 2017

(54) WIRELESS COMMUNICATION SYSTEM, COMMUNICATION APPARATUS, WIRELESS COMMUNICATION METHOD AND TERMINAL APPARATUS

(75) Inventors: Kazuyuki Shimezawa, Osaka (JP); Toshizo Nogami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 923 days.

(21) Appl. No.: 13/436,330

(22) Filed: Mar. 30, 2012

(65) Prior Publication Data

US 2012/0213111 A1 Aug. 23, 2012

Related U.S. Application Data

(63) Continuation of application No. PCT/JP2010/066085, filed on Sep. 16, 2010.

(30) Foreign Application Priority Data

Oct. 2, 2009 (JP) .................................. 2009-230623

(51) Int. Cl.
*H04W 24/10* (2009.01)
*H04B 7/06* (2006.01)
(Continued)

(52) U.S. Cl.
CPC ............ *H04W 24/10* (2013.01); *H04B 7/063* (2013.01); *H04L 1/0026* (2013.01);
(Continued)

(58) Field of Classification Search
None
See application file for complete search history.

(56) References Cited

U.S. PATENT DOCUMENTS 6,356,555 B1 *  3/2002  Rakib ................. H03M 13/256
                                              348/E7.07
7,580,445 B2 *  8/2009  Wang .................. H04B 1/7103
                                              375/146
(Continued)

FOREIGN PATENT DOCUMENTS

JP        2007-28569 A       2/2007
JP        2008-506330 A      2/2008
(Continued)

OTHER PUBLICATIONS

Astely et al., "Method for Transmitting of Reference Signals and Determination of Precoding Matrices for Multi-Antenna Transmission", U.S. Appl. No. 61/110,668, filed Nov. 3, 2008, pp. 1-19 as corresponding to PGPUB US20110205930A1 and.*
(Continued)

*Primary Examiner* — Gregory Sefcheck
(74) *Attorney, Agent, or Firm* — Birch, Stewart, Kolasch & Birch, LLP

(57) ABSTRACT

A base station is provided with a reference signal for channel state measurement generation part that generates a reference signal for channel state measurement for a mobile terminal to measure a channel state, and transmission antenna parts, that transmit reference signal for channel state measurements to the mobile terminal with each transmission antenna port. The mobile terminal is provided with reception antenna parts, that receive the reference signal for channel state measurements transmitted from the base station in reception antenna ports, and a feedback information generation part which measures a channel state between the transmission antenna port and the reception antenna port based on the received reference signal for channel state measurement to calculate a channel state estimation value, performs group-
(Continued)

ing on a plurality of channel state estimation values, and generates feedback information for the base station.

13 Claims, 15 Drawing Sheets

(51) Int. Cl.
*H04L 1/06* (2006.01)
*H04L 1/20* (2006.01)
*H04L 1/00* (2006.01)
*H04L 1/18* (2006.01)
*H04L 5/00* (2006.01)
*H04L 25/02* (2006.01)

(52) U.S. Cl.
CPC ............. *H04L 1/0029* (2013.01); *H04L 1/06* (2013.01); *H04L 1/20* (2013.01); *H04L 1/0003* (2013.01); *H04L 1/0009* (2013.01); *H04L 1/1812* (2013.01); *H04L 5/0007* (2013.01); *H04L 25/0224* (2013.01); *H04L 2001/0092* (2013.01)

(56) References Cited

U.S. PATENT DOCUMENTS

| | | | |
|---|---|---|---|
| 7,675,988 B2 | 3/2010 | Kim et al. | |
| 7,933,564 B2* | 4/2011 | Le Nir | H04B 7/0697 375/267 |
| 7,948,960 B2 | 5/2011 | Okamoto | |
| 8,098,750 B2* | 1/2012 | Mueck | H04L 1/0625 375/260 |
| 8,160,121 B2* | 4/2012 | Forenza et al. | 375/141 |
| 8,213,293 B2* | 7/2012 | Lee | H04B 7/0452 370/208 |
| 8,472,539 B2* | 6/2013 | Ko | H04L 5/0023 375/260 |
| 8,477,867 B2* | 7/2013 | Yang | H04B 7/024 375/267 |
| 8,537,924 B2* | 9/2013 | Jongren | H04B 7/0639 375/267 |
| 8,553,798 B2* | 10/2013 | Wang | H04B 7/0426 375/227 |
| 8,699,446 B2* | 4/2014 | Kuchi | H04B 7/0413 370/330 |
| 8,705,510 B2* | 4/2014 | Kim | H04B 7/022 370/332 |
| 8,737,507 B2* | 5/2014 | Astely | H04B 7/0417 367/138 |
| 8,811,353 B2* | 8/2014 | Chen | H04L 5/0053 370/329 |
| 8,891,651 B2* | 11/2014 | Lee, II | H04B 7/0413 375/259 |
| 8,971,426 B2* | 3/2015 | Ko | H04B 7/0465 370/335 |
| 9,059,755 B2* | 6/2015 | Jongren | H04L 25/03343 |
| 9,154,352 B2* | 10/2015 | Palanki | H04B 7/2606 |
| 9,219,532 B2* | 12/2015 | Nishio | H04W 72/10 |
| 9,264,117 B2* | 2/2016 | Chen | H04L 5/0053 |
| 9,553,645 B2* | 1/2017 | Lee, II | H04B 7/0413 |
| 2006/0039494 A1 | 2/2006 | Kim et al. | |
| 2007/0202818 A1 | 8/2007 | Okamoto | |
| 2008/0056414 A1 | 3/2008 | Kim et al. | |
| 2008/0080641 A1 | 4/2008 | Kim | |
| 2008/0188190 A1* | 8/2008 | Prasad et al. | 455/114.3 |
| 2008/0317014 A1* | 12/2008 | Veselinovic et al. | 370/380 |
| 2009/0213955 A1 | 8/2009 | Higuchi et al. | |
| 2010/0067368 A1* | 3/2010 | Lee et al. | 370/210 |
| 2010/0067605 A1 | 3/2010 | Jongren | |
| 2010/0074316 A1* | 3/2010 | Kim et al. | 375/228 |
| 2011/0009079 A1 | 1/2011 | Okamoto | |
| 2011/0205930 A1* | 8/2011 | Rahman et al. | 370/252 |
| 2011/0255503 A1 | 10/2011 | Okamoto | |

FOREIGN PATENT DOCUMENTS

| | | |
|---|---|---|
| JP | 2008-61253 A | 3/2008 |
| WO | WO 2006/006826 A1 | 1/2006 |
| WO | WO 2006/035637 A1 | 4/2006 |
| WO | WO 2008/030806 A2 | 3/2008 |
| WO | WO 2008/133582 A2 | 11/2008 |

OTHER PUBLICATIONS

3GPP TR 36.814 V1.2.1, "3rd Generation Partnership Project; Technical Specification Group Radio Access Network; Further Advancements for E-UTRA; Physical Layer Aspects (Release 9)", vol. 6, pp. 1-49, 2009.
3GPP TS 36.213 V8.7.0, "3rd Generation Partnership Project; Technical Specification Group Radio Access Network; Evolved Universal Terrestrial Radio Access (E-UTRA); Physical layer procedures (Release 8)", vol. 5, pp. 1-77, 2009.
3GPP TSG-RAN WG1 #57bis, R1-092310, "Comparison of CSI Feedback Schemes", Alcatel-Lucent, Agenda item: 15.2, pp. 1-11, Jun. 3-Jul. 2009.
Extended European Search Report issued in EP Patent Application No. 10820377.9 on Apr. 2, 2013.
Nokia Siemens Networks, Nokia, "Single Stream Precoding for LTE-Advanced UL", 15.5, 3GPP TSG-RAN WG1 Meeting #56bis R1-091365, Seoul, Korea, Mar. 23-27, 2009.
Texas Instruments, "Description of Per-Group Rate Control (PGRC) and System Level Comparison With Per-Antenna Rate Control (PARC)", 6.6.1 3GPP TSG RAN WG1#46bis R1-062645, Seoul Korea, Oct. 9-13, 2006.

\* cited by examiner

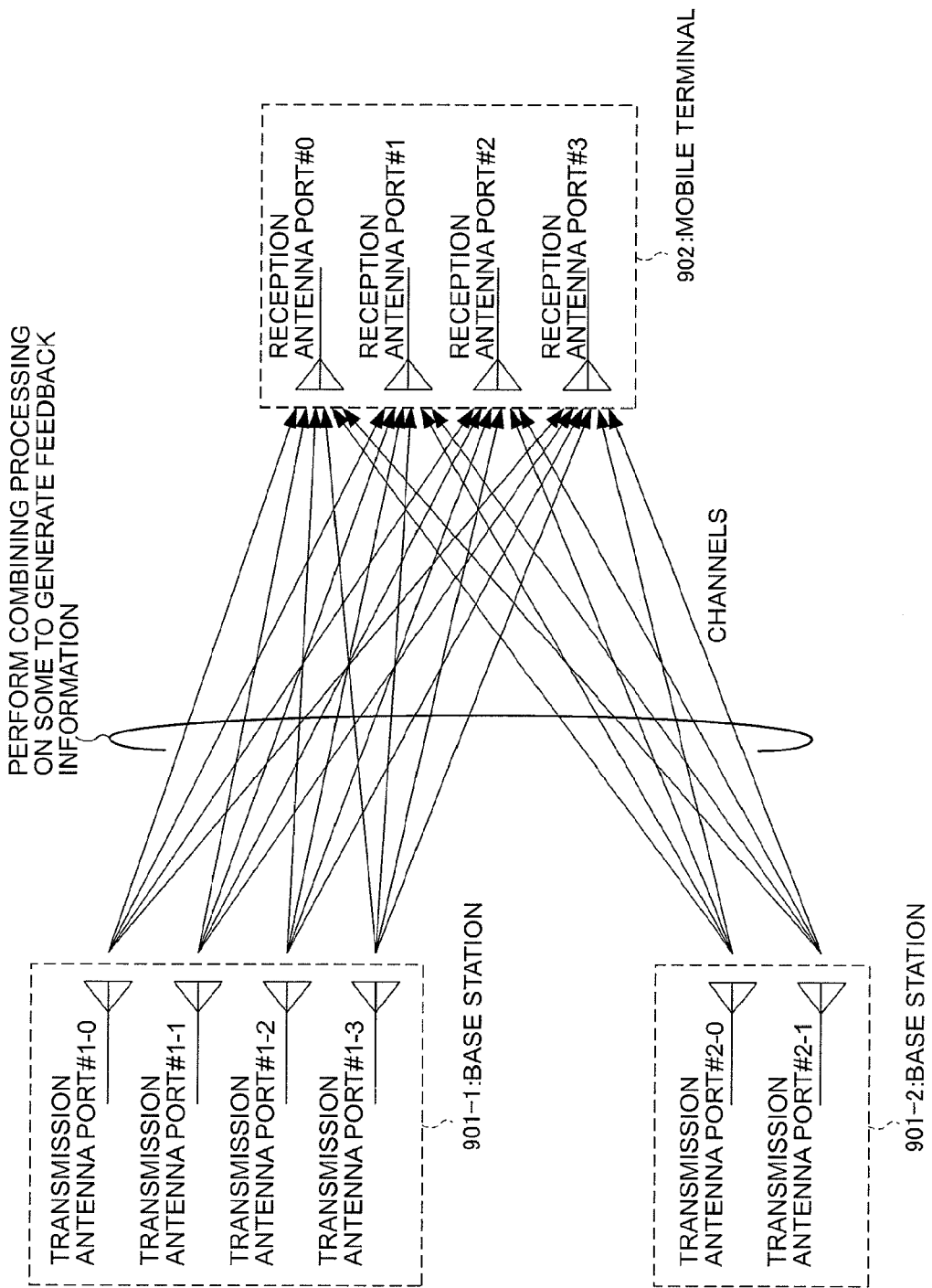

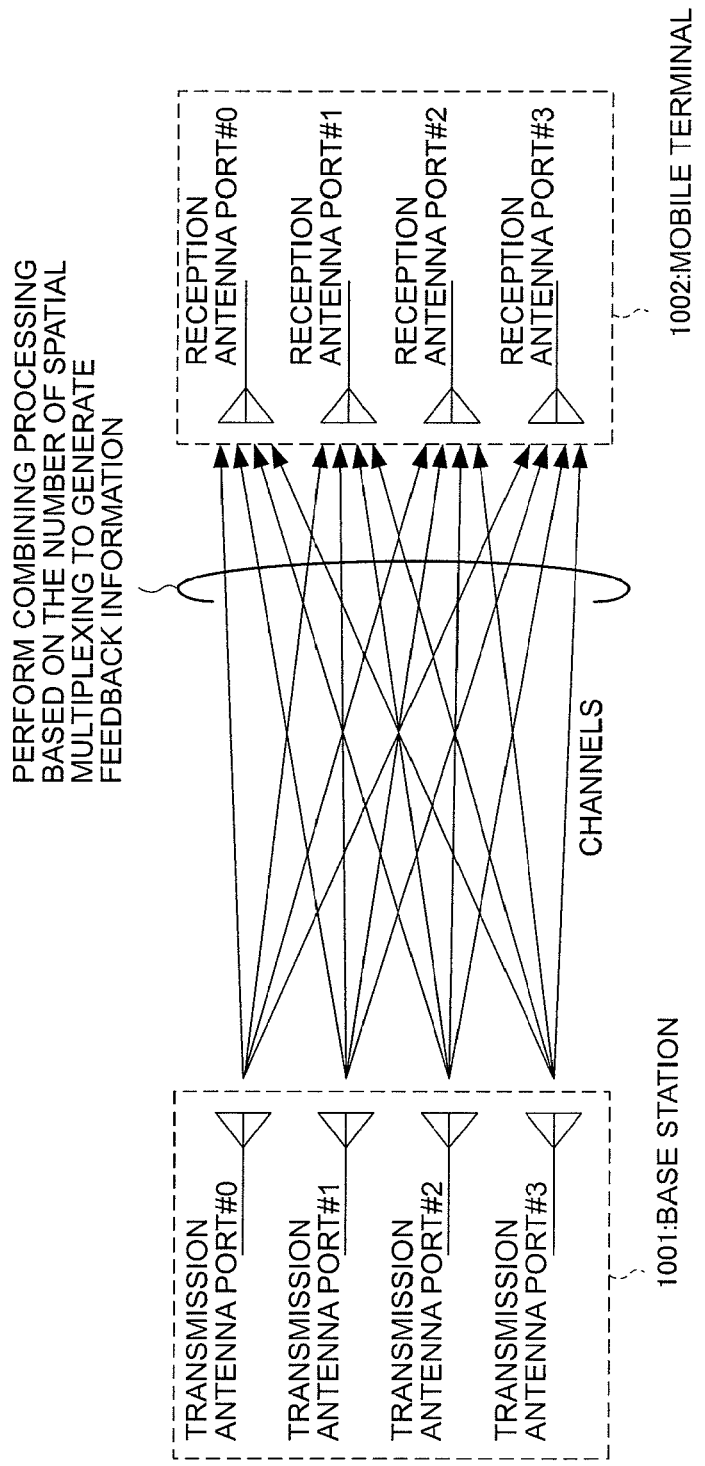

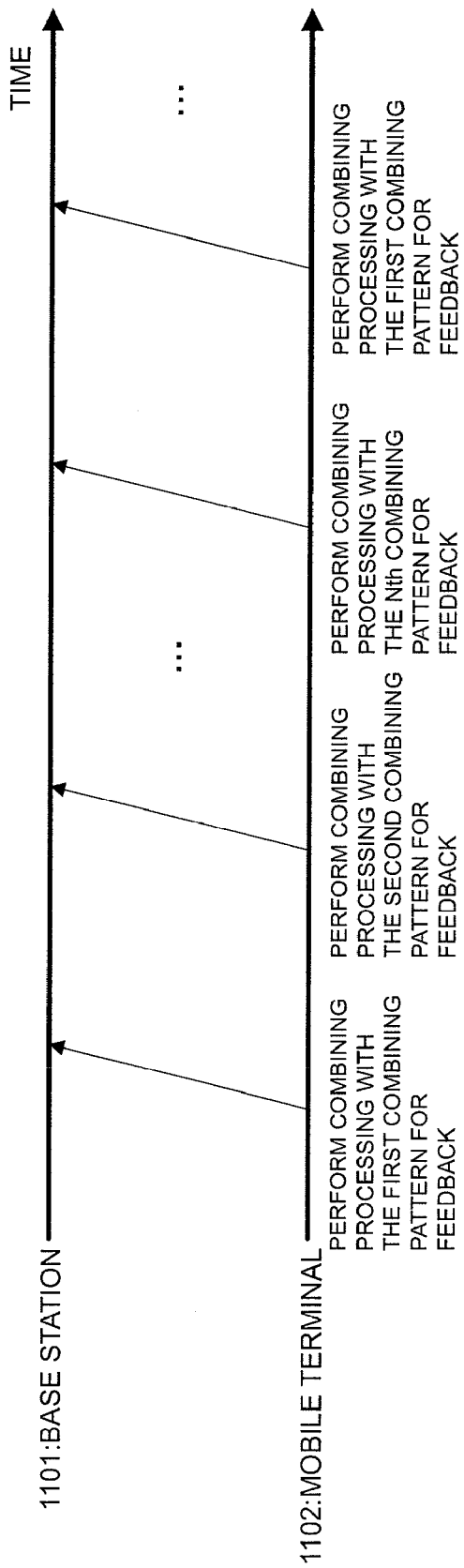

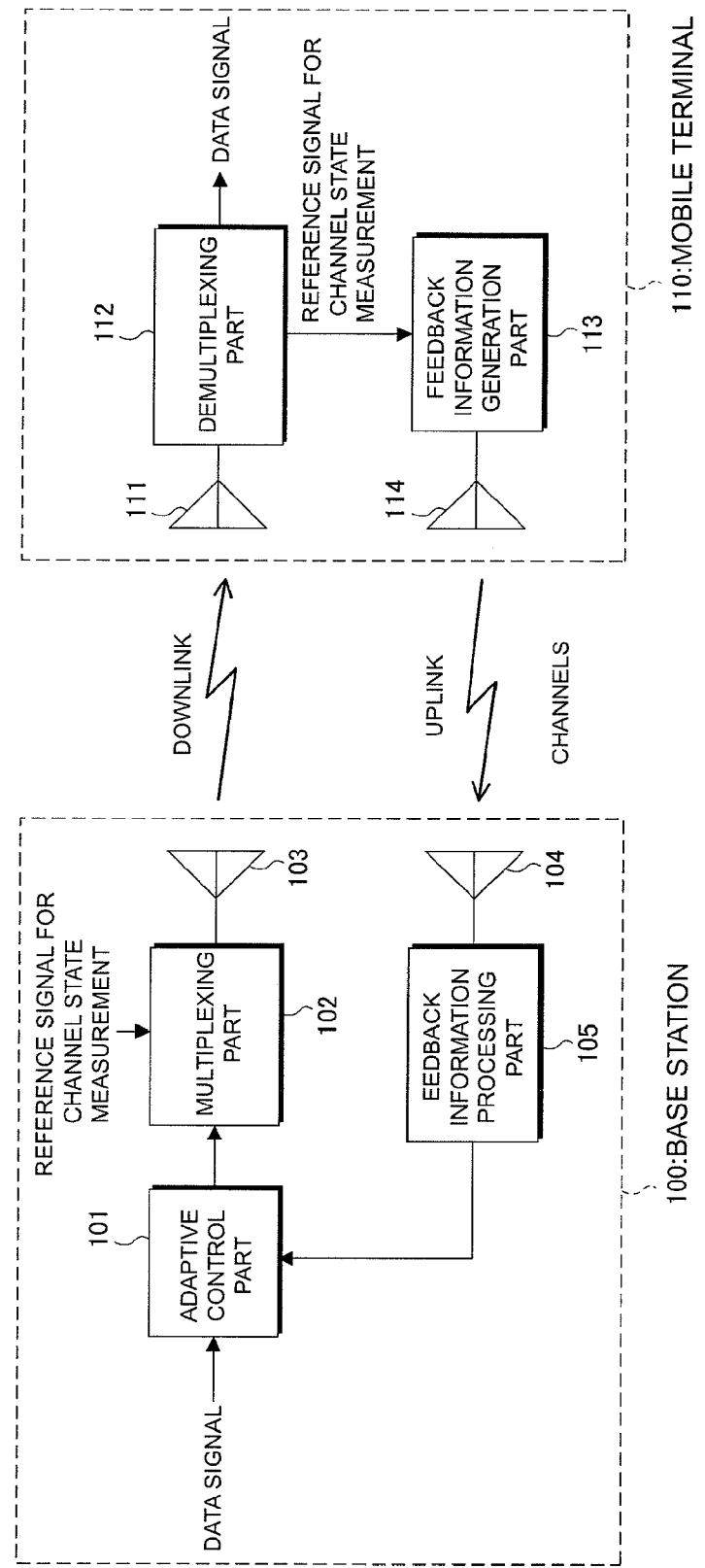

WIRELESS COMMUNICATION SYSTEM, COMMUNICATION APPARATUS, WIRELESS COMMUNICATION METHOD AND TERMINAL APPARATUS

This application is a Continuation of PCT/JP2010/066085 filed on Sep. 16, 2010, which claims priority under 35 U.S.C. §119(a) to Patent Application No. 2009-230623 filed in the Japan on Oct. 2, 2009, all which are hereby incorporated by reference into the present application

TECHNICAL FIELD

The present invention relates to techniques of performing adaptive control, and more particularly, to a wireless communication system, communication apparatus, wireless communication method and terminal apparatus capable of efficiently performing adaptive control on a feedback method of channel state.

BACKGROUND ART

For example, in mobile wireless communication systems such as LTE (Long Term Evolution), LTE-Advanced, and WiMAX, each of a base station and a mobile terminal is provided with a plurality of transmission/reception antennas, and is capable of achieving high-speed data transmission by MIMO (Multi Input Multi Output) techniques. Meanwhile, by using a reference signal for channel state measurement, a mobile terminal estimates a channel state between the base station and the mobile terminal, adaptively controls the modulation scheme and coding rate (MCS (Modulation and Coding Scheme)), the number of spatial multiplexing (layers, rank), precoding weights (precoding matrix) and the like based on the estimation result, and is thereby capable of achieving more efficient data transmission. For example, it is possible to use the method as described in Non-patent Document 1.

Meanwhile, in the case of using multicarrier transmission schemes such as an OFDM (Orthogonal Frequency Division Multiplexing) scheme and OFDMA (Orthogonal Frequency Division Multiple Access) scheme as a transmission scheme, it is possible to use reference signals scattered in resource elements (each of which is an element comprised of one subcarrier in one OFDM symbol) in the frequency domain and the time domain as a reference signal for channel state measurement specific to a base station. As feedback information to estimate using such a reference signal for channel state measurement, it is possible to use information based on the channel state (explicit CSI (Channel State Information)), recommended transmission format information (implicit CSI (for example, including the CQI (Channel Quality Indicator), RI (Rank Indicator), PMI (Precoding Matrix Index), etc.) for the base station, and the like.

Particularly, since the explicit CSI is information based on the actual channel state, the feedback information amount is large as compared with the implicit CSI that is index information mainly based on a code book. Therefore, in Non-patent Documents 2 and 3 are studied techniques for reducing the information amount of explicit CSI, and for example, studied are techniques using eigenvalue decomposition, orthogonal transform such as DCT (Discrete Cosine Transform), vector quantization, and the like.

PRIOR ART DOCUMENT

Non-Patent Document

Non-patent Document 1: 3rd Generation Partnership Project; Technical Specification Group Radio Access Network; Evolved Universal Terrestrial Radio Access (E-UTRA); Physical layer procedures (Release 8), 3GPP TS 36.213 V8.7.0 (2009-05), May 2009.

Non-patent Document 2: 3rd Generation Partnership Project; Technical Specification Group Radio Access Network; Further Advancements for E-UTRA Physical Layer Aspects (Release 9), 3GPP TR 36.814 V1.2.1 (2009-06), June 2009.

Non-patent Document 3: Alcatel-Lucent, "Comparison of CSI Feedback Schemes," R1-092310, 3GPPTSG-RANWG1 #57bis, Los Angeles, Calif., USA, June 2009.

DISCLOSURE OF INVENTION

Problems to be Solved by the Invention

However, as the number of transmission/reception antennas increases, the number of pieces of feedback information to be fed back increases, resulting in a factor for interfering with efficient data transmission.

The present invention was made in view of such circumstances, and it is an object of the invention to provide a wireless communication system, communication apparatus, wireless communication method and terminal apparatus capable of efficiently performing adaptive control even when the number of transmission/reception antennas is large.

Means for Solving the Problem (1) To attain the aforementioned object, the present invention took measures as described below. In other words, a wireless communication system of the present invention is a wireless communication system in which a first communication apparatus and a second communication apparatus perform wireless communication, and is characterized in that the first communication apparatus is provided with a reference signal for channel state measurement generation part that generates a reference signal for channel state measurement for the second communication apparatus to measure a channel state, and a transmission antenna part that transmits the reference signal for channel state measurement to the second communication apparatus with each transmission antenna port, and that the second communication apparatus is provided with a reception antenna part that receives the reference signal for channel state measurement transmitted from the first communication apparatus in a reception antenna port, and a feedback information generation part which measures a channel state between the transmission antenna port and the reception antenna port based on the received reference signal for channel state measurement to calculate a channel state estimation value, performs grouping on a plurality of channel state estimation values, and generates feedback information for the first communication apparatus.

Thus, the second communication apparatus performs grouping on a plurality of channel state estimation values, and generates the feedback information for the first communication apparatus, and it is thereby possible to significantly reduce the information amount of feedback information. Further, for example, from the viewpoint of a power amplifier, in a system that signals are output from all transmission antenna ports in the first communication apparatus, it is possible to actualize data transmission from the first communication apparatus to the second communication apparatus without stopping a part thereof.

(2) Further, the wireless communication system of the present invention is characterized by having a plurality of first communication apparatuses that perform cooperative communication for the second communication apparatus, where the feedback information generation part measures a channel state between the transmission antenna port of each of the first communication apparatuses and the reception antenna port to calculate a channel state estimation value, and performs grouping on at least two channel state estimation values to generate the feedback information.

Thus, the second communication apparatus measures the channel state between the transmission antenna port of each of the first communication apparatuses and the reception antenna port to calculate a channel state estimation value, and performs grouping on at least two channel state estimation values to generate the feedback information, and therefore, the second communication apparatus positioned between the first communication apparatuses is capable of greatly reducing the effect of interference between the same channels. Further, it is possible to significantly reduce the information amount of feedback information.

(3) Furthermore, in the wireless communication system of the present invention, the feedback information generation part is characterized by generating information indicative of the measured channel state as the feedback information.

Thus, the second communication apparatus generates the information indicative of the measured channel state as the feedback information, and it is thereby possible to significantly reduce the information amount of the information based on the channel state (explicit CSI (Channel State Information)).

(4) Still furthermore, in the wireless communication system of the present invention, the feedback information generation part is characterized by generating recommended transmission format information for the first communication apparatus as the feedback information.

Thus, the second communication apparatus generates the recommended transmission format information for the first communication apparatus as the feedback information, and it is thereby possible to greatly reduce the information amount of the recommended transmission format information (implicit CSI (for example, including the CQI (Channel Quality Indicator), RI (Rank Indicator), PMI (Precoding Matrix Index), etc.) for the first communication apparatus, and the like.

(5) Moreover, in the wireless communication system of the present invention, the feedback information generation part is characterized by performing grouping on beforehand specified channel state estimation values and thereby generating the feedback information.

Thus, the second communication apparatus performs grouping on beforehand specified channel state estimation values and thereby generates feedback information, and it is thereby possible to significantly reduce the information amount of feedback information. Further, for example, from the viewpoint of a power amplifier, in a system that signals are output from all transmission antenna ports in the first communication apparatus, it is possible to actualize data transmission from the first communication apparatus to the second communication apparatus without stopping apart thereof.

(6) Further, in the wireless communication system of the present invention, the feedback information generation part is characterized by selecting channel state estimation values to be performed grouping from among all the calculated channel state estimation values, performing grouping on the selected channel state estimation values, and thereby generating the feedback information.

Thus, the second communication apparatus selects channel state estimation values to perform grouping from among all the measured channel state estimation values, performs grouping on the selected channel state estimation values, and is thereby capable of transmitting the feedback information flexibly corresponding to the channel state.

(7) Furthermore, in the wireless communication system of the present invention, the feedback information generation part is characterized by further generating information indicative of the selected channel state estimation values as the feedback information.

Thus, the second communication apparatus further generates the information indicative of the selected channel state estimation value as the feedback information, and therefore, the first communication apparatus is capable of grasping the transmission antenna port and the reception antenna port that perform combining processing.

(8) Still furthermore, in the wireless communication system of the present invention, the feedback information generation part is characterized by performing grouping on the channel state estimation values based on a code word unit.

Thus, the second communication apparatus performs grouping on the channel state estimation values based on a code word unit, and is thereby capable of performing combining processing on antenna ports that output the same code word.

(9) Moreover, in the wireless communication system of the present invention, the feedback information generation part is characterized by performing grouping on the channel state estimation values based on a configuration of at least one of the transmission antenna part and the reception antenna part.

Thus, the second communication apparatus performs grouping on the channel state estimation values based on the configuration of at least one of the transmission antenna part and the reception antenna part, and is thereby capable of performing combining processing on the antenna ports corresponding to characteristics of the antenna port.

(10) Further, in the wireless communication system of the present invention, the feedback information generation part is characterized by performing grouping on the channel state estimation values based on an an antenna correlation between the transmission antenna part and the reception antenna part.

Thus, the second communication apparatus performs grouping on the channel state estimation values based on the antenna correlation between the transmission antenna part and the reception antenna part, and is thereby capable of performing combining processing, for example, on antenna ports with the high antenna correlation of the transmission antenna.

(11) Furthermore, in the wireless communication system of the present invention, the feedback information generation part is characterized by performing grouping on the channel state estimation values based on polarization of at least one of the transmission antenna part and the reception antenna part.

Thus, the second communication apparatus performs grouping on the channel state estimation values based on polarization of at least one of the transmission antenna part and the reception antenna part, and is thereby capable of performing combining processing, for example, on antenna ports with the same antenna polarization of the transmission antenna.

(12) Still furthermore, in the wireless communication system of the present invention, the feedback information generation part is characterized by performing grouping on the channel state estimation values based on the number of spatial multiplexing to be used by the first communication apparatus for the second communication apparatus.

Thus, the second communication apparatus performs grouping on the channel state estimation values based on the number of spatial multiplexing to be used by the first communication apparatus for the second communication apparatus, and therefore, for example, is capable of performing combining processing so that the number of feedbacks for transmission antenna ports subjected to the combining processing is the same as the number of spatial multiplexing determined in the first communication apparatus or the second communication apparatus.

(13) Moreover, in the wireless communication system of the present invention, the feedback information generation part is characterized by defining a plurality of combining patterns in performing grouping on the channel state estimation values, and performing grouping on the channel state estimation values based on any one of the combining patterns.

Thus, the second communication apparatus defines a plurality of combining patterns in performing grouping on the channel state estimation values, performs grouping on the channel state estimation values based on any one of the combining patterns, and is thereby capable of dynamically performing the combining processing, and it is possible to actualize excellent characteristics.

(14) Further, in the wireless communication system of the present invention, the feedback information generation part is characterized by selecting the combining pattern based on at least one parameter among a parameter concerning the time axis, a parameter concerning the frequency axis, and a parameter concerning the first communication apparatus or a parameter concerning the second communication apparatus.

Thus, the second communication apparatus selects the combining pattern based on at least one parameter among a parameter concerning the time axis, a parameter concerning the frequency axis, and a parameter concerning the first communication apparatus or a parameter concerning the second communication apparatus, thereby eliminates the need for notification or feedback of the information concerning the combining pattern to use, and is capable of reducing overhead concerning the information.

(15) Further, a communication apparatus of the present invention is a communication apparatus that performs wireless communication with another communication apparatus, and is characterized by having a reception antenna part that receives a reference signal for channel state measurement transmitted from a transmission antenna port of the another communication apparatus in a reception antenna port, and a feedback information generation part which measures a channel state between the transmission antenna port and the reception antenna port based on the received reference signal for channel state measurement to calculate a channel state estimation value, performs grouping on a plurality of channel state estimation values, and generates feedback information for the another communication apparatus.

Thus, the communication apparatus performs grouping on a plurality of channel state estimation values, and generates the feedback information for another communication apparatus, and it is thereby possible to significantly reduce the information amount of feedback information. Further, for example, from the viewpoint of a power amplifier, in a system that signals are output from all transmission antenna ports in another communication apparatus, it is possible to actualize data transmission from another communication apparatus to the communication apparatus without stopping apart thereof.

(16) Furthermore, in the communication apparatus of the present invention, the feedback information generation part is characterized by measuring a channel state between transmission antenna ports of a plurality of other communication apparatuses and the reception antenna port to calculate channel state estimation values, and performing grouping on at least two channel state estimation values to generate the feedback information.

Thus, the communication apparatus measures a channel state between transmission antenna ports of a plurality of other communication apparatuses and the reception antenna port to calculate channel state estimation values, and performs grouping on at least two channel state estimation values to generate the feedback information, and therefore, the communication apparatus positioned between the other communication apparatuses is capable of greatly reducing the effect of interference between the same channels. Further, it is possible to significantly reduce the information amount of feedback information.

(17) Further, a wireless communication method of the present invention is a wireless communication method in which a first communication apparatus and a second communication apparatus perform wireless communication, and is characterized by comprising at least the steps in the first communication apparatus of generating a reference signal for channel state measurement for the second communication apparatus to measure a channel state, and transmitting the reference signal for channel state measurement to the second communication apparatus with each transmission antenna port, and the steps in the second communication apparatus of receiving the reference signal for channel state measurement transmitted from the first communication apparatus in a reception antenna port, measuring a channel state between the transmission antenna port and the reception antenna port based on the received reference signal for channel state measurement to calculate a channel state estimation value, performing grouping on a plurality of channel state estimation values to generate feedback information, and transmitting the generated feedback information to the first communication apparatus.

Thus, the second communication apparatus performs grouping on a plurality of channel state estimation values to generate the feedback information, and it is thereby possible to significantly reduce the information amount of feedback information. Further, for example, from the viewpoint of a power amplifier, in a system that signals are output from all transmission antenna ports in the first communication apparatus, it is possible to actualize data transmission from the first communication apparatus to the second communication apparatus without stopping a part thereof.

(18) Furthermore, in the wireless communication method of the present invention, it is a feature that the feedback information generation part measures a channel state between transmission antenna ports of a plurality of first communication apparatuses and the reception antenna port to calculate channel state estimation values, and performs grouping on at least two channel state estimation values to generate the feedback information.

Thus, the second communication apparatus measures a channel state between the transmission antenna ports of a plurality of first communication apparatuses and the reception antenna port to calculate channel state estimation values, and performs grouping on at least two channel state estimation values to generate the feedback information, and therefore, the second communication apparatus positioned between the first communication apparatuses is capable of greatly reducing the effect of interference between the same channels. Further, it is possible to significantly reduce the information amount of feedback information.

(19) Moreover, a terminal apparatus of the present invention is characterized by having a feedback information generation part which obtains a precoding matrix that provides an optimal reception state in grouping transmission antenna ports, and generates feedback information indicative of the obtained precoding matrix.

Thus, the precoding matrix is obtained that provides an optimal reception state in grouping transmission antenna ports, the feedback information indicative of the obtained precoding matrix is generated, and it is thereby possible to obtain the precoding matrix that provides an optimal reception state. Herein, as the optimal reception state, for example, there can be a state in which the reception power is the maximum, another state in which interfering power from another base station and another mobile terminal is small (including the case of using an interference canceller, etc.) and the like.

(20) Further, a terminal apparatus of the present invention is characterized by having a feedback information generation part which obtains a precoding matrix that is of precoding weights such that each of grouped transmission antenna ports performs the same precoding processing and that provides an optimal reception state, and generates feedback information indicative of the obtained precoding matrix.

Thus, the precoding matrix is obtained which is of precoding weights such that each of grouped transmission antenna ports performs the same precoding processing and provides an optimal reception state, the feedback information indicative of the obtained precoding matrix is generated, and it is thereby possible to obtain the precoding matrix that provides the optimal reception state.

(21) Furthermore, in the terminal apparatus of the present invention, the feedback information generation part is characterized by performing grouping on the transmission antenna ports for each cross polarization antenna.

Thus, grouping is performed on the transmission antenna ports for each cross polarization antenna, and it is thereby possible to perform combining processing on only a part of transmission antenna ports.

(22) Still furthermore, a terminal apparatus of the present invention is a terminal apparatus that performs communications with a base station apparatus, and is characterized by having a reception antenna part that receives a reference signal for channel state measurement transmitted from a transmission antenna port of the base station apparatus in a reception antenna port, and a feedback information generation part which measures a channel state between the transmission antenna port and the reception antenna port using the received reference signal for channel state measurement to calculate a channel state estimation value, and generates feedback information for the base station apparatus based on a frequency response calculated by performing grouping on a plurality of channel state estimation values.

Thus, the terminal apparatus receives a reference signal for channel state measurement transmitted from the transmission antenna port of the base station apparatus in the reception antenna port, measures a channel state between the transmission antenna port and the reception antenna port using the received reference signal for channel state measurement to calculate a channel state estimation value, and generates feedback information for the base station apparatus based on a frequency response calculated by performing grouping on a plurality of channel state estimation values, and it is thereby possible to significantly reduce the information amount of feedback information. Further, for example, from the viewpoint of a power amplifier, in a system that signals are output from all transmission antenna ports in the base station, it is possible to actualize data transmission from the base station to the mobile terminal without stopping a part thereof.

Advantageous Effect of the Invention

According to the present invention, it is possible to significantly reduce the information amount of feedback information that the mobile terminal transmits to the base station. Further, for example, from the viewpoint of a power amplifier, in a system that signals are output from all transmission antenna ports in the base station, it is possible to actualize data transmission from the base station to the mobile terminal without stopping a part thereof.

BRIEF DESCRIPTION OF DRAWINGS

FIG. 12 is a diagram showing a communication system comprised of transmission antenna ports #1-0 to #1-3 in a base station 901-1, transmission antenna ports #2-0 and #2-1 in a base station 901-2 and reception antenna ports #0 to #3 in a mobile terminal 902, as an example of Embodiment 6 of the present invention;

FIG. 13 is a diagram showing a communication system comprised of transmission antenna ports #0 to #3 in a base station 1001 and reception antenna ports #0 to #3 in a mobile terminal 1002, as an example of Embodiment 7 of the present invention;

FIG. 14 is a diagram showing an example of Embodiment 8 of the present invention where N types of patterns to perform combining processing are beforehand defined and a mobile terminal 1102 performs combining processing by any one of N types of combining patterns to perform feedback to a base station 1101; and FIG. 15 is a block diagram showing an example for performing adaptive control in the case of considering downlink in which a base station 100 performs data transmission to a mobile terminal 110.

BEST MODE FOR CARRYING OUT THE INVENTION

Figure 1:
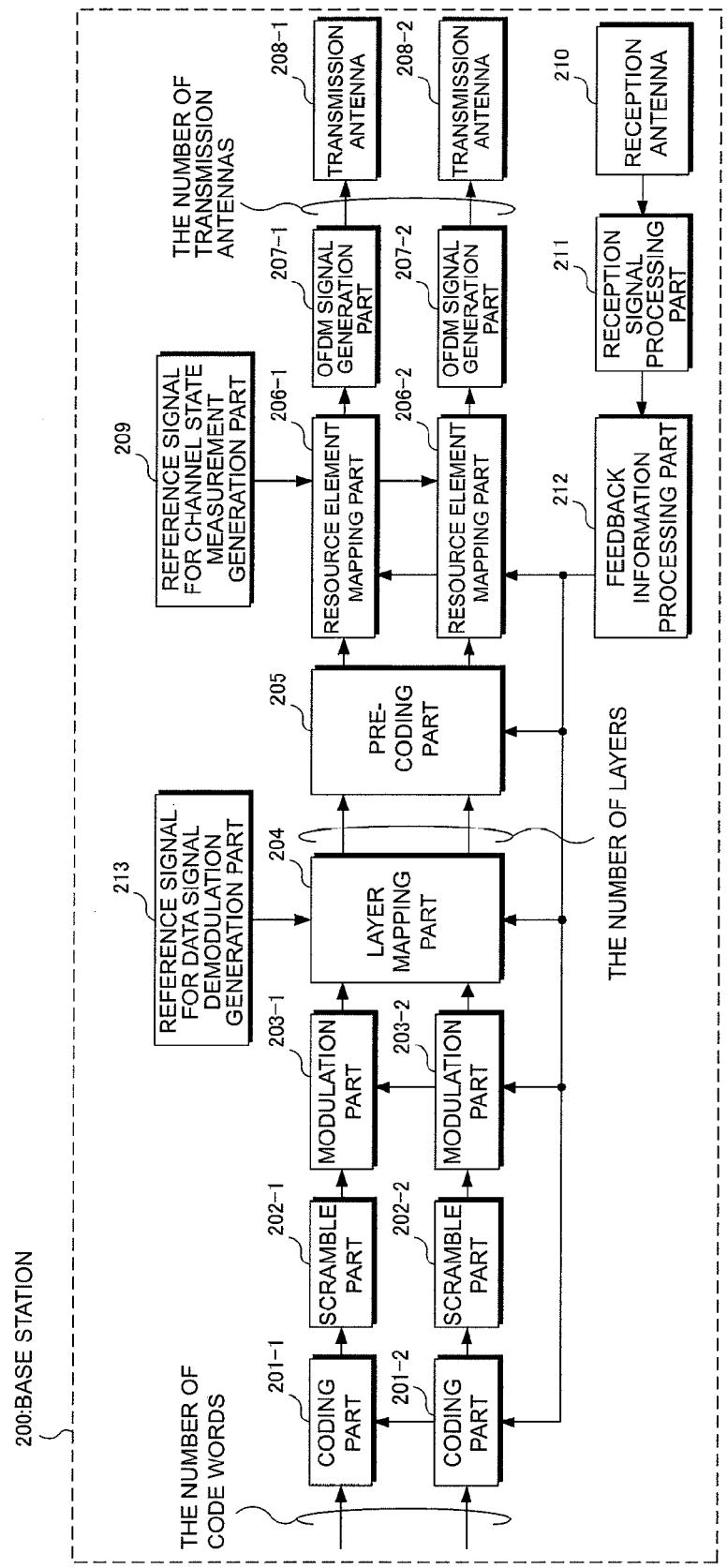
FIG. 1 is a schematic block diagram showing a configuration of a base station 200 of the present invention.

FIG. 15 is a block diagram showing an example for performing adaptive control in the case of considering downlink in which a base station 100 performs data transmission to a mobile terminal 110. In the base station 100, first, a multiplexing part 102 multiplexes a reference signal for channel state measurement (RS (Reference Signal), pilot signal, predefined signal) specific to the base station into a data signal for the mobile terminal 110 or a data signal for another mobile terminal 110, and transmits the signal from a transmission antenna (transmission antenna part) 103.

In the mobile terminal 110, a demultiplexing part 112 demultiplexes the reference signal for channel state measurement from the signal received in a reception antenna (reception antenna part) 111. A feedback information generation part 113 generates feedback information based on the reference signal for channel state measurement, and transmits the information from a transmission antenna 114 via uplink. In the base station 100, a feedback information processing part 105 identifies the feedback information transmitted from the mobile terminal 110 from the signal received in the reception antenna 104 to process. An adaptive control part 101 performs adaptive control on the data signal for the mobile terminal 110 based on the received feedback information. Embodiments of the invention will be described below with reference to drawings.

Embodiment 1

Embodiment 1 of the present invention will be described below. A communication system in Embodiment 1 is provided with a base station (transmission apparatus, cell, transmission point, transmission antenna group, first communication apparatus, serving base station, eNodeB, and base station apparatus) and a mobile terminal (reception point, reception terminal, reception apparatus, second communication apparatus, UE (User Equipment) and terminal apparatus).

FIG. 1 is a schematic block diagram showing a configuration of the base station 200 of the invention. In FIG. 1, the base station 200 is provided with a coding part 201, scramble part 202, modulation part 203, layer mapping part 204, precoding part 205, resource element mapping part 206, OFDM signal generation part 207, transmission antenna 208, reference signal for channel state measurement generation part 209, reception antenna 210, reception signal processing part 211, feedback information processing part 212, and reference signal for data signal demodulation generation part 213. The reception antenna 210 receives a data signal including feedback information transmitted from a mobile terminal 300 (FIG. 3, described later) via uplink (for example, PUCCH (Physical Uplink Control CHannel), PUSCH (Physical Uplink Control CHannel), etc.).

The reception signal processing part 211 performs, on the signal received in the reception antenna 210, reception processing such as OFDM demodulation processing, demodulation processing, decoding processing and the like in response to transmission processing that the mobile terminal 300 performs for transmission, and identifies the feedback information from the received signal to output to the feedback information processing part 212. In addition, in the case where a plurality of mobile terminals 300 that perform communications with the base station 200 exists, as uplink, it is possible to multiplex a plurality of mobile terminals 300 using various multiple access schemes including SC-FDMA (Single Carrier-Frequency Division Multiple Access), Clustered SC-FDMA, OFDMA, Time Division Multiple Access, Code Division Multiple Access, etc.

Further, it is possible to use various methods as a method for identifying the feedback information for each mobile terminal 300 in the base station 200. For example, the base station 200 designates resources (elements divided in time, frequency, code or spatial domain or the like to transmit signals) for each mobile terminal 300 to transmit the feedback information, the mobile terminal 300 transmits the feedback information with the designated resources, and the base station 200 is thereby capable of identifying. Further, it is also possible to identify the feedback information by actualizing to add a specific identification number for each mobile terminal 300 to respective feedback information.

The feedback information processing part 212 generates adaptive control information to perform various adaptive control on a data signal to transmit to the mobile terminal 300, based on the input feedback information such as explicit CSI, CQI, PMI, RI, etc. The part 212 generates the adaptive control information in the base station 200 to output to the coding part 201, modulation part 203, layer mapping part 204, precoding part 205 and resource element mapping part 206 in the base station 200.

Described herein is a method of adaptive control based on the feedback information. First, in the case where transmission format information recommended for the base station 200 is input as the feedback information, it is assumed that the predefined transmission format is beforehand indexed in both the base station 200 and the mobile terminal 300, and the base station 200 performs adaptive control based on the transmission format. More specifically, the CQI is information indicative of a coding rate and modulation scheme, and thereby respectively enables the coding part 201 and modulation part 203 to be controlled, the PMI is information indicative of a precoding matrix, and thereby enables the precoding part 205 to be controlled, and the RI is information indicative of the number of layers (rank), and thereby enables the layer mapping part 204 and the higher layer for generating code words to be controlled. Further, in the case of also including the feedback information concerning mapping to resources, it is also possible to control the resource element mapping part 206. In addition, these types of adaptive control do not need to always comply with the received recommended transmission format information, and it is possible to determine based on various factors such as status of other mobile terminals, status of the communication system and the like.

Next, in the case where information indicative of the channel state (explicit CSI) is input as the feedback information, the base station 200 is capable of determining adaptive control. For example, the base station 200 determines a precoding matrix so that power when the mobile terminal 300 receives is the maximum based on the information that is fed back, and is capable of determining the optimal coding rate, modulation scheme and the number of layers at that time, and it is possible to use various methods.

The coding part 201 receives one or more code words (transmission data signal, information data signal) to transmit that are input from a processing apparatus of a higher layer of the transmission apparatus, not shown. Each of the code words is encoded with error correction codes such as turbo codes, convolutional codes, LDPC (Low Density Parity Check) codes and the like, and outputs the resultant to the scramble part 202. Herein, as the code word, a processing unit for performing retransmission control of HARQ (Hybrid Automatic Repeat reQuest) or the like, a processing unit for performing error correction coding, or a plurality of the units may be used.

The scramble part 202 generates scramble codes varying with each base station 200, and performs scrambling processing on the signal encoded in the coding part 201 using the generated scramble code. The modulation part 203 performs modulation processing on the scrambling-processed signal using a modulation scheme such as BPSK (Binary Phase Shift Keying), QPSK (Quadrature Phase Shift Keying), QAM (Quadrature Amplitude Modulation), etc., and outputs the resultant to the layer mapping part 204. The reference signal for data signal demodulation generation part 213 generates reference signal for data signal demodulations (Dm-RS (Demodulation Reference Signal), DRS (Dedicated Reference Signal), Precoded RS, user specific reference signal, UE-specific RS) orthogonal between layers (Rank, spatial multiplexing) as a reference signal for the mobile terminal 300 to demodulate an information data signal, and outputs the signal to the layer mapping part 204.

At this point, as the reference signal for data signal demodulation, it is possible to use arbitrary signals (sequences), as long as the signals are predefined signals in both the base station 200 and the mobile terminal 300. For example, it is possible to use a random number based on a beforehand assigned parameter such as a number specific to the base station 200 (cell ID), a number specific to the mobile terminal 300 (RNTI; Radio Network Temporary Identifier), etc., and pseudo noise sequences (for example, it is possible to use M (Maximum-length) sequences, Gold codes, orthogonal Gold codes, Walsh codes, OVSF (Orthogonal Variable Spreading Factor) codes, Hadamard codes, Barker codes, etc., and further, sequences obtained by cyclically shifting these sequences, or cyclically expanding these sequences may be used. Furthermore, it is possible to search for sequences excellent in auto-correlation characteristics and/or cross-correlation characteristics using a computer and the like to use.) Moreover, as a method of orthogonalizing between layers, it is possible to use the method (for example, time division multiplexing, frequency division multiplexing, etc.) for making resource elements to map the reference signal for data signal demodulation null (zero) mutually between layers, the method of code division multiplexing using the pseudo noise sequence, etc.

The layer mapping part 204 maps the reference signal for data signal demodulation input from the reference signal for data signal demodulation generation part 213 to each of layers to perform spatial multiplexing such as MIMO. Further, the part 204 maps signals output from respective modulation parts 203 to resource elements except the reference signal for data signal demodulation for each layer. For example, when it is assumed that the number of code words is "2" and that the number of layers is "8", it is conceivable that each code word is converted into four parallel signals to make the number of layers "8", but the invention is not limited thereto.

The precoding part 205 performs precoding processing on the signal output from the layer mapping part 204 to transform into parallel signals corresponding to the number of antenna ports (transmission antennas, logical ports). Herein, as the precoding processing, it is possible to use the processing with a beforehand determined precoding matrix, CDD (Cyclic Delay Diversity), and transmission diversity (SFBC (Spatial Frequency Block Code), STBC (Spatial Time Block Code), TSTD (Time Switched Transmission Diversity), FSTD (Frequency Switched Transmission Diversity), etc.), but the invention is not limited thereto.

The reference signal for channel state measurement generation part 209 generates a reference signal for channel state measurement (cell specific reference signal, CRS (Common RS), Cell-specific RS, Non-precoded RS) that is already known mutually between the base station 200 and the mobile terminal 300 so as to measure the channel state between the base station 200 and the mobile terminal 300 (more specifically, between the transmission antenna 208 and a reception antenna 301 (FIG. 3, described later)), and outputs the signal to the resource element mapping part 206. At this point, as the reference signal for channel state measurement, it is possible to use arbitrary signals (sequences), as long as the signals are predefined signals in both the base station 200 and the mobile station 300. For example, it is possible to use a random number and pseudo noise sequences based on a beforehand assigned parameter such as a number specific to the base station 200 (cell ID (Identification)). Further, as a method of orthogonalizing between antenna ports, it is possible to use the method for making resource elements to map the reference signal for channel state measurement null (zero) mutually between antenna ports, the method of code division multiplexing using the pseudo noise sequence, etc.

The resource element mapping part 206 maps the transmission data signal output from the precoding part 205 and the reference signal for channel state measurement output from the reference signal for channel state measurement generation part 209 to resource elements of respective antenna ports.

Figure 2:
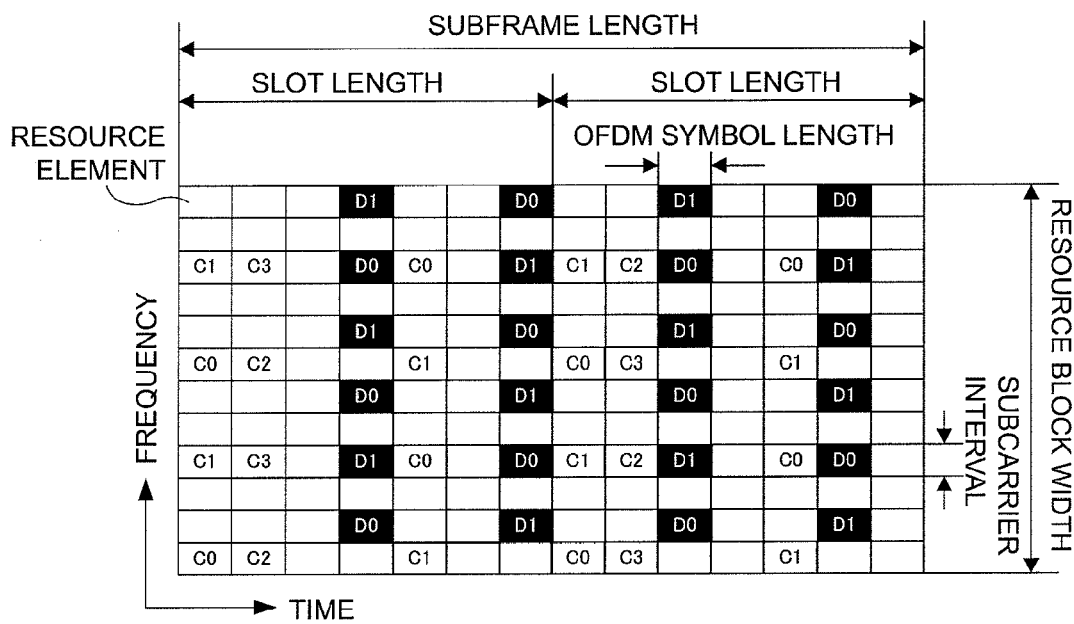
FIG. 2 is a diagram showing an example of a reference signal for data signal demodulation, reference signal for channel state measurement, information data signal or control information signal mapped by a layer mapping part 204 and resource element mapping part 206.

FIG. 2 is a diagram showing an example of the reference signal for data signal demodulation, reference signal for channel state measurement, information data signal or control information signal mapped by the layer mapping part 204 and resource element mapping part 206. FIG. 2 shows the case of mapping these signals when the number of antenna ports is "4" and the number of layers is "2". Further, FIG. 2 shows a single resource block comprised of 12 subcarriers in the frequency domain and 14 OFDM symbols in the time domain. In a single OFDM symbol, each subcarrier is also called the resource element. In each subframe, 7 consecutive OFDM symbols in the time domain are also called the slot.

Among resource elements except white rectangles in FIG. 2, reference signal for data signal demodulations of layer numbers 0 and 1 are respectively represented by D0 and D1, and reference signals for channel state measurement of antenna ports #0 to #3 are respectively represented by C0 to C3. Further, in resource elements of reference signals mapped to respective layers and antenna ports, resource elements in the other layers and antenna ports are not assigned any signals, and made zero (null), and orthogonalization is thereby established between layers and antenna ports. In addition, as another method of establishing orthogonalization between layers and antenna ports, it is also possible to apply code division multiplexing using pseudo noise sequences.

In addition, it is also possible to change the number of OFDM symbols of a resource block. For example, in the case of adding a long guard interval length, it is possible to set the number of OFDM symbols of a single slot at "6". Further, information data signals or control information signals are mapped to resource elements except the resource elements to which the reference signals are mapped in FIG. 2. In addition, in this example, it is possible to set the number of layers of the information data signal or control information signal at "2" at the maximum, and for example, it is possible to set the number of layers of the information data signal at "2", while setting the number of layers of the control information signal at "1".

Herein, it is possible to change the number of resource blocks corresponding to the frequency bandwidth (system bandwidth) used in the communication system. For example, it is possible to use 6 to 110 resource blocks, and further, it is also possible to make the entire system bandwidth more than 110 by frequency aggregation. A normal component carrier is comprised of 100 physical resource blocks, and with a guard interval inserted in between component carriers, the entire system bandwidth can be comprised of 500 physical resource blocks using component carriers. In expression thereof by the bandwidth, for example, the component carrier is comprised of 20 MHz, and with a guard interval inserted in between component carriers, it is possible to make the entire system bandwidth 100 MHz using 5 component carriers. In addition, it is also possible to further arrange subcarriers in between component carriers.

The OFDM signal generation part 207 performs frequency-time transform processing on the signal in the frequency domain output from the resource element mapping part 206 by Inverse Fast Fourier Transform (IFFT) or the like to transform in to the signal in the time domain. Further, by cyclically expanding a part of respective OFDM symbols, the guard interval (cyclic prefix) is added. The transmission antenna 208 performs processing for converting the signal output from the OFDM signal generation part 207 from the baseband into a radio frequency, and the like, and then, transmits the signal.

Figure 3:
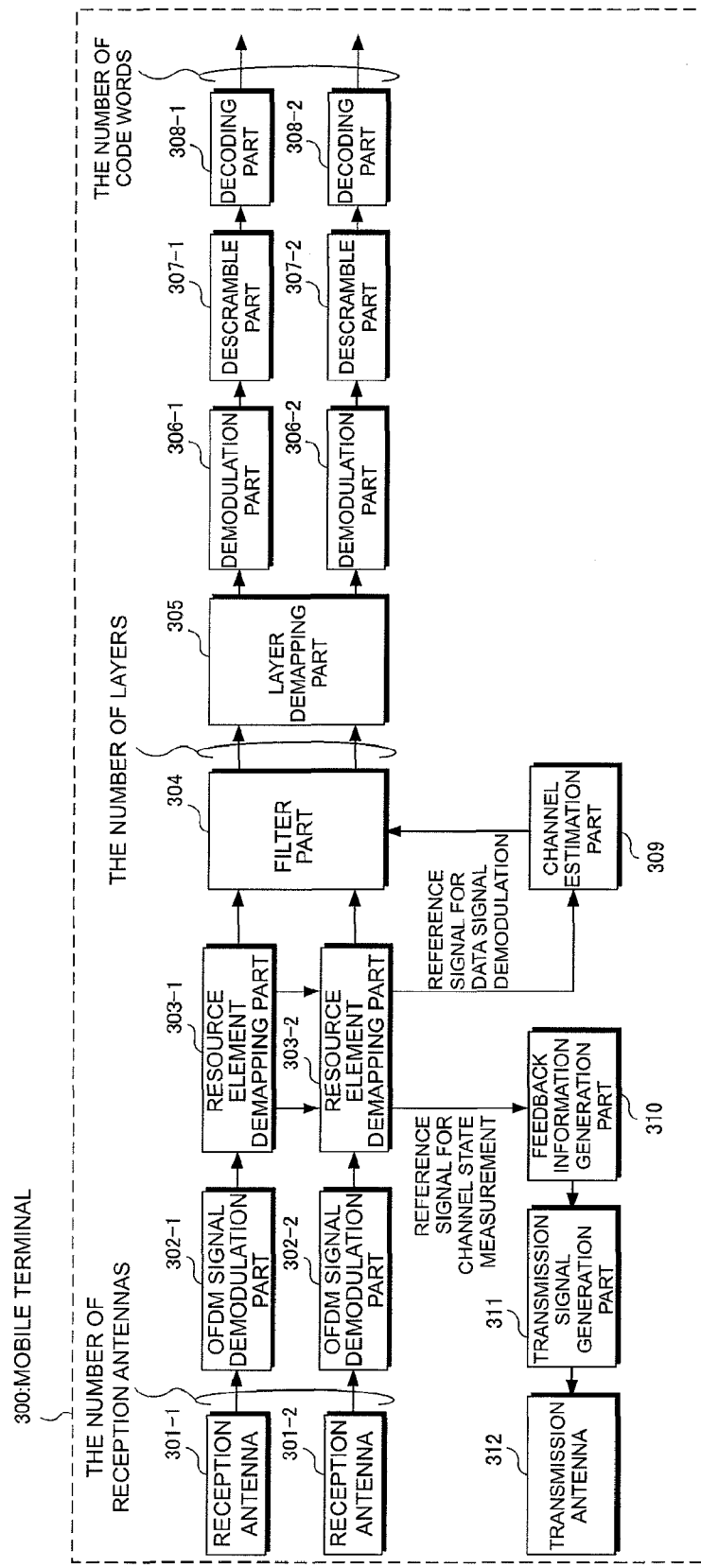
FIG. 3 is a schematic block diagram showing a configuration of a mobile terminal 300 of the present invention.

FIG. 3 is a schematic block diagram showing a configuration of the mobile terminal 300 of the invention. In FIG. 3, the mobile terminal 300 is provided with the reception antenna 301, OFDM signal demodulation part 302, resource element demapping part 303, filter part 304, layer demapping part 305, demodulation part 306, descramble part 307, decoding part 308, channel estimation part 309, feedback information generation part 310 (channel state measurement part), transmission signal generation part 311, and transmission antenna 312. The mobile terminal 300 is provided with the reception antenna 301 having at least one transmission antenna, and the reception antenna 301 receives a signal which is transmitted from the base station 200 and passed through the channel, and performs processing for converting the signal with the radio frequency into a baseband signal, and the like. The OFDM signal demodulation part 302 removes the added guard interval, and performs time-frequency transform processing by Fast Fourier Transform (FFT) or the like to transform into the signal in the frequency domain.

At this point, the reception signal (received signal) at the kth subcarrier is expressed as described below.

$$R(k) = H(k)S(k) + N(k) \quad [\text{Eq. 1}]$$

$$R(k) = [R_0(k) \ldots R_{N_R-1}(k)]^T \quad [\text{Eq. 2}]$$

$$H_{Dm}(k) = \begin{bmatrix} H_{Dm;0,0}(k) & \cdots & H_{Dm;0,N_{TL}-1}(k) \\ \vdots & \ddots & \vdots \\ H_{Dm;N_R-1,0}(k) & \cdots & H_{Dm;N_R-1,N_{TL}-1}(k) \end{bmatrix} \quad [\text{Eq. 3}]$$

$$S(k) = [S_0(k) \ldots S_{N_{TL}-1}(k)]^T \quad [\text{Eq. 4}]$$

$$N(k) = [N_0(k) \ldots N_{N_R-1}(k)]^T \quad [\text{Eq. 5}]$$

In addition, $N_{TL}$ represents the number of transmission layers, $N_R$ represents the number of reception antennas, $R(k)$ represents a reception signal corresponding to each reception antenna, $S(k)$ represents a transmission signal (information data signal or control information signal) corresponding to each transmission layer, $N(k)$ is noise corresponding to each reception antenna, $H_{Dm}(k)$ is a frequency response corresponding to each reception antenna and each transmission layer, and T represents a transposed matrix. Each element $H_{Dm; z, y}(k)$ of $H_{Dm}(k)$ represents a frequency response of a reception antenna port y (y=0, . . . , $N_R-1$) associated with a transmission layer z (z=0, . . . , $N_{TL}-1$). In addition, it is preferable that $H_{Dm}(k)$ is estimated from the reference signal for data signal demodulation. The resource element demapping part 303 demaps (divides) the signal mapped in the base station 200, outputs the information data signal to the filter part 304, outputs the reference signal for channel state measurement to the feedback information generation part 310, and further, outputs the reference signal for data signal demodulation to the channel estimation part 309.

Based on the input reference signal for data signal demodulation, the channel estimation part 309 performs estimation of variations (frequency response, transfer function) of amplitude and phase in each resource element (channel estimation) for each layer of each reception antenna 301, and obtains a channel estimation value. In addition, on resource elements to which the reference signal for data signal demodulation is not mapped, interpolation is made in the frequency domain and the time domain based on resource elements to which the reference signal for data signal demodulation is mapped, and channel estimation is performed. As the interpolation method, it is possible to use various methods including linear interpolation, parabola interpolation, polynomial interpolation, Lagrange interpolation, spline interpolation, FFT interpolation, Minimum Mean Square Error (MMSE) interpolation, etc.

The filter part 304 performs channel compensation on the data signal for each reception antenna 301 output from the resource element demapping part 303, using the channel estimation value output from the channel estimation part 309, and detects a transmission signal S(k). As the detection method, it is possible to use ZF (Zero Forcing) standard, MMSE standard and the like. For example, when the weighting factor used in detection of ZF standard or MMSE standard is assumed to be $M_{ZF}$ or $M_{MMSE}$, it is possible to use the following weighting factor.

$$M_{ZF}(k) = \hat{H}_{Dm}^{H}(k)(\hat{H}_{Dm}(k)\hat{H}_{Dm}^{H}(k))^{-1} \quad [\text{Eq. 6}]$$

$$M_{MMSE}(k) = \hat{H}_{Dm}^{H}(k)(\hat{H}_{Dm}(k)\hat{H}_{Dm}^{H}(k) + \hat{\sigma}^2 I_{N_R})^{-1} \quad [\text{Eq. 7}]$$

In addition, $H\square(k)$ represents an estimated frequency response, $H\square^{H}(k)$ represents a complex conjugate transposed matrix of $H\square(k)$, −1 represents an inverse matrix, $\sigma\square^2$ represents noise power, and $I_{NR}$ represents a unit matrix of $N_R \times N_R$. The transmission signal for each transmission layer is estimated using their weighting factor M(k). Assuming that the estimated transmission signal is $S\square(k)$, it is possible to detect as described below.

$$\hat{S}(k) = M(k)R(k) \quad [\text{Eq. 8}]$$

Further, as other detection methods, it is possible to apply methods (for example, QRM-MLD (QR decomposition and M-algorithm MLD), etc.) based on MLD (Maximum Likelihood Detection), methods (for example, Turbo SIC, MMSE-SIC, BLAST (Bell Laboratories Layered Space-Time architecture), etc.) based on SIC (Successive Interference Cancellation), methods based on PIC (Parallel Interference Cancellation), etc. The layer demapping part 305 performs demapping processing on the signal for each layer to respective code words. The demodulation part 306 performs demodulation based on the modulation scheme used in the base station 200. The descramble part 307 performs descramble processing based on the scramble code used in the base station 200. The decoding part 308 performs error correction decoding processing based on the coding method applied in the base station 200, and outputs the resultant to a processing apparatus of a higher layer of the mobile terminal 300, not shown. Meanwhile, the feedback information generation part 310 generates feedback information based on the reference signal for channel state measurement output from the resource element demapping part 303.

Figure 4:
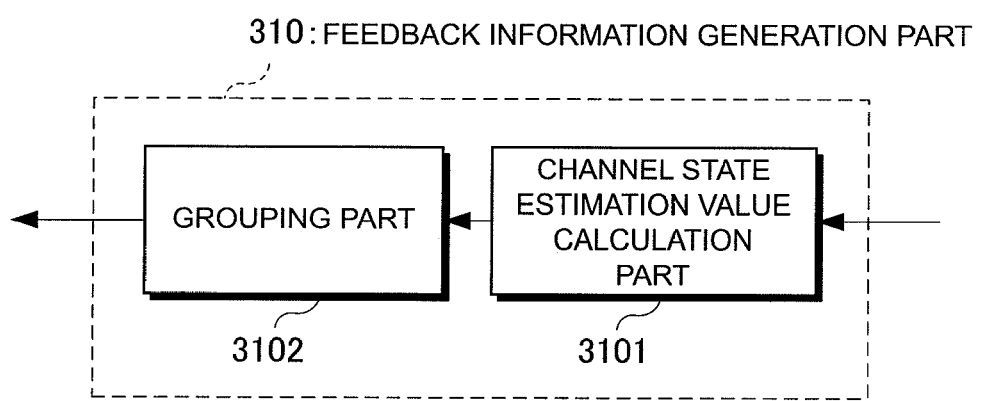
FIG. 4 is a schematic block diagram showing a configuration of a feedback information generation part 310 of the present invention.

FIG. 4 is a schematic block diagram showing a configuration of the feedback information generation part 310 of the invention. In FIG. 4, the feedback information generation part 310 is provided with a channel state estimation value calculation part 3101, and grouping part 3102. As a method of generating the feedback information, using the received reference signal for channel state measurement, measured are a frequency response, SINR (Signal to Interference plus Noise power Ratio) of received signal, SIR (Signal to Interference power Ratio) of received signal, SNR (Signal to Noise power Ratio) of received signal, path loss and the like in each reception antenna port associated with a respective transmission antenna port, and it is possible to generate the feedback information using these values.

Further, as a unit for generating the feedback information, it is possible to use the frequency domain (for example, subcarrier basis, resource element basis, resource block basis, basis of a sub-band comprised of a plurality of resource blocks, etc.), time domain (for example, OFDM symbol basis, subframe basis, slot basis, radio frame basis, etc.), spatial domain (for example, antenna port basis, transmission antenna basis, reception antenna basis, etc.) and the like, and further, it is also possible to combine them. In order to transmit (feed back) the feedback information output from the feedback information generation part 310 to the base station 200, the transmission signal generation part 311 performs coding processing, modulation processing, transmission signal generation processing and the like, and generates a transmission signal. The transmission antenna 312 transmits the transmission signal including the feedback information generated in the transmission signal generation part 311 to the base station 200 via uplink.

Described further is a detailed procedure when the mobile terminal 300 generates the feedback information. Described first is the case of obtaining the explicit CSI as the feedback information. The channel state estimation value calculation part 3101 obtains the channel state in each reception antenna port associated with a respective transmission antenna port. The frequency response in the kth subcarrier at this point is expressed as described below.

$$H(k) = \begin{bmatrix} H_{0,0}(k) & \cdots & H_{0,N_T-1}(k) \\ \vdots & \ddots & \vdots \\ H_{N_R-1,0}(k) & \cdots & H_{N_R-1,N_T-1}(k) \end{bmatrix} \quad [\text{Eq. 9}]$$

In addition, $N_T$ represents the number of transmission antennas, $N_R$ represents the number of reception antennas, and H(k) represents a frequency response corresponding to each reception antenna and each transmission antenna. Each element Hx,y(k) of H(k) represents a frequency response of a reception antenna port y (y=0, . . . , $N_R$−1) associated with a transmission antenna port (x=0, . . . , $N_T$−1). In addition, it is preferable that H(k) is estimated from the reference signal for channel state measurement.

At this point, to reduce the feedback information amount of explicit CSI, the grouping part 3102 performs combining processing (grouping) on frequency responses of at least two antenna ports among both or either of the transmission antenna ports and reception antenna ports. Herein, as the combining processing, it is possible to perform various kinds of processing such as addition, multiplication, averaging operation (including arithmetic mean and geometric mean), comparison operation (including maximum, minimum and selection), etc. Further, it is also possible to perform weighting on antenna ports to perform the combining processing, and for example, it is possible to increase the weight of an antenna port with the excellent channel state, but the invention is not limited thereto. The case of performing addition as the combining processing will be described below.

Figure 5:
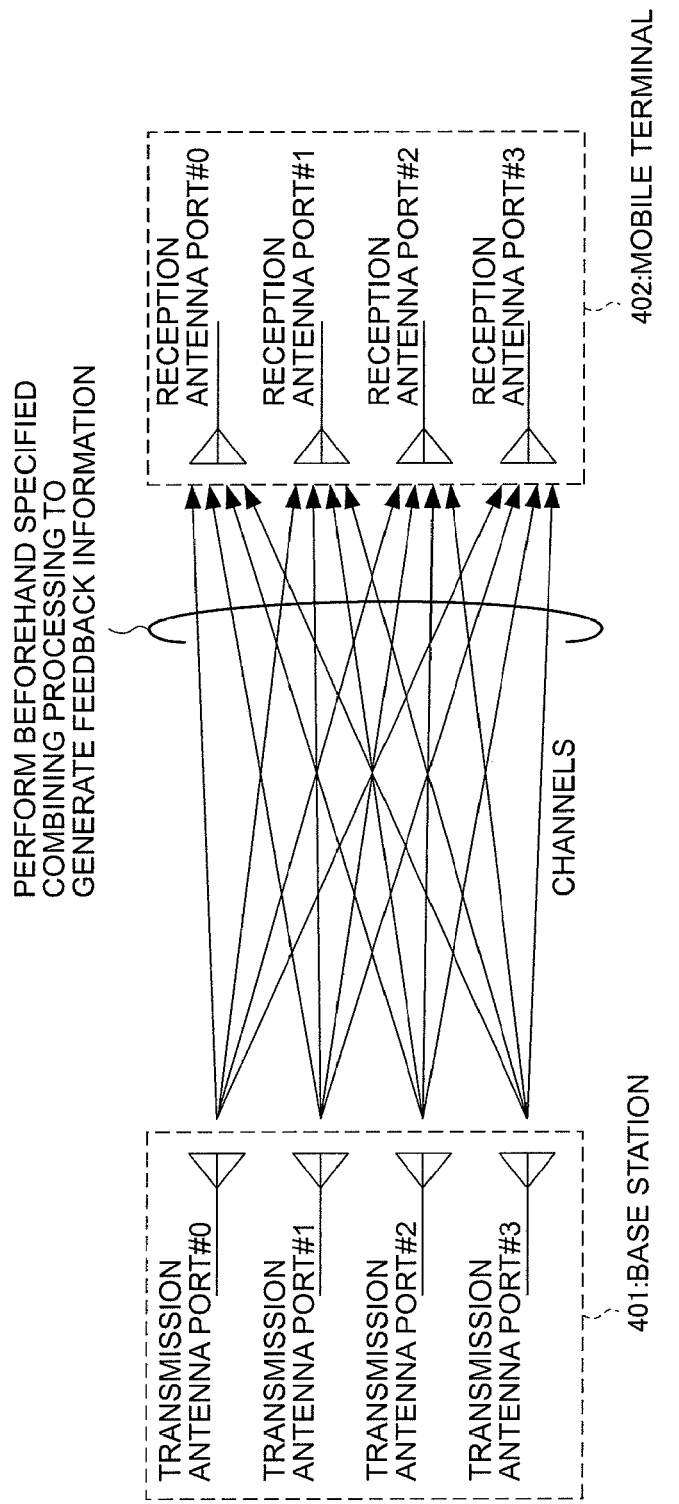
FIG. 5 is a diagram showing a communication system comprised of transmission antenna ports #0 to #3 in a base station 401 and reception antenna ports #0 to #3 in a mobile terminal 402, as an example of Embodiment 1 of the present invention.

FIG. 5 is a diagram showing a communication system comprised of transmission antenna ports #0 to #3 in a base station 401 and reception antenna ports #0 to #3 in a mobile terminal 402, as an example of Embodiment 1 of the invention. At this point, the frequency response at the kth subcarrier is expressed as described below.

$$H(k) = \begin{bmatrix} H_{0,0}(k) & H_{0,1}(k) & H_{0,2}(k) & H_{0,3}(k) \\ H_{1,0}(k) & H_{1,1}(k) & H_{1,2}(k) & H_{1,3}(k) \\ H_{2,0}(k) & H_{2,1}(k) & H_{2,2}(k) & H_{2,3}(k) \\ H_{3,0}(k) & H_{3,1}(k) & H_{3,2}(k) & H_{3,3}(k) \end{bmatrix} \quad [\text{Eq. 10}]$$

In generating the feedback information, the mobile terminal 402 performs the combining processing by two beforehand specified ports among transmission antenna ports #0 to #3 and reception antenna ports #0 to #3. For example, the combining processing is performed on transmission antenna ports #0 and #2 and on transmission antenna ports #1 and #3, and further, the combining processing is performed on reception antenna ports #0 and #2 and on reception antenna ports #1 and #3. The frequency response H'(k) at this point is expressed as described below.

$$H'(k) = \begin{bmatrix} H_{0,0}(k) + H_{2,0}(k) + & H_{0,1}(k) + H_{2,1}(k) + \\ H_{0,2}(k) + H_{2,2}(k) & H_{0,3}(k) + H_{2,3}(k) \\ H_{1,0}(k) + H_{3,0}(k) + & H_{1,1}(k) + H_{3,1}(k) + \\ H_{1,2}(k) + H_{3,2}(k) & H_{1,3}(k) + H_{3,3}(k) \end{bmatrix}$$ [Eq. 11]

Based on the combining-processed frequency response H'(k), the mobile terminal 402 generates the explicit CSI. At this point, as the feedback information, the frequency response H'(k) may be used without modification, and further, it is also possible to apply techniques of amplitude quantization, phase quantization, eigenvalue decomposition, orthogonal transform such as DCT, vector quantization, and the like. In addition, the explicit CSI may be generated based on the frequency response obtained by performing the combining processing on only the transmission antenna ports, and for example, the frequency response in performing the combining processing on transmission antenna ports #0 and #2 and on transmission antenna ports #1 and #3 is expressed as described below.

$$H'(k) = \begin{bmatrix} H_{0,0}(k) + H_{2,0}(k) & H_{0,1}(k) + H_{2,1}(k) & H_{0,2}(k) + H_{2,2}(k) & H_{0,3}(k) + H_{2,3}(k) \\ H_{1,0}(k) + H_{3,0}(k) & H_{1,1}(k) + H_{3,1}(k) & H_{1,2}(k) + H_{3,2}(k) & H_{1,3}(k) + H_{3,3}(k) \end{bmatrix}$$ [Eq. 12]

In addition, the explicit CSI may be generated based on the frequency response obtained by performing the combining processing on only the reception antenna ports, and for example, the frequency response in performing the combining processing on reception antenna ports #0 and #2 and on reception antenna ports #1 and #3 is expressed as described below.

$$H'(k) = \begin{bmatrix} H_{0,0}(k) + H_{0,2}(k) & H_{0,1}(k) + H_{0,3}(k) \\ H_{1,0}(k) + H_{1,2}(k) & H_{1,1}(k) + H_{1,3}(k) \\ H_{2,0}(k) + H_{2,2}(k) & H_{2,1}(k) + H_{2,3}(k) \\ H_{3,0}(k) + H_{3,2}(k) & H_{3,1}(k) + H_{3,3}(k) \end{bmatrix}$$ [Eq. 13]

As described above, by performing the combining processing on frequency responses of at least two antenna ports among both or either of the transmission antenna ports and reception antenna ports, it is possible to significantly reduce the information amount of feedback information.

Further, as the feedback information, it is also possible to obtain the implicit CSI based on the frequency response subjected to the already-described combining processing. For example, the following description is a procedure for obtaining the CQI, PMI and RI based on the SINR. In addition, each of the CQI and PMI may be beforehand set as a plurality of types of patterns (indexes) so as to select one closest to the pattern. The frequency response subjected to the already-described combining processing is used as a channel state estimation value to obtain the implicit CSI. In the case of determining the RI, the number of layers is determined using the technique of eigenvalue decomposition or the like. At this point, it is preferable to set the number of rows or columns being lower of the combining-processed frequency response matrix at the maximum number of layers.

In the case of determining the PMI, based on the combining-processed frequency pesponse, a precoding matrix is obtained so as to obtain an optimal reception state. As the optimal reception state, for example, there can be a state in which the reception power is the maximum, another state in which interfering power from another base station and another mobile terminal is small (including the case of using an interference canceller, etc.) and the like. In addition, it is also possible to obtain using the technique of eigenvalue decomposition or the like. In the case of determining the CQI, a look-up table of CQIs that meet required quality in association with the SINR is beforehand set, the SINR in using the determined RI and PMI is obtained, and the CQI is determined from the look-up table. At this point, it is preferable that the CQI is determined so that the error rate in the mobile terminal 402 is "0.1".

As described above, by obtaining the implicit CSI using a frequency response obtained by performing the combining processing on frequency responses of at least two antenna ports among both or either of the transmission antenna ports and reception antenna ports, for example, it is possible to decrease the number of look-up tables of the PMI and the like, and it is possible to reduce the information amount of feedback information. Further, when the feedback information amount is the same, it is possible to further enhance accuracy of the precoding processing.

Described next is transmission of a transmission data signal of the base station 401 to the mobile terminal 402 using the feedback information as described above. As the transmission method, it is possible to use various methods. For example, in the communication system as shown in FIG. 5, the following description is the case of performing the combining processing (grouping) on transmission antenna ports #0 and #1 and transmission antenna ports #2 and #3 among transmission antenna ports #0 to #3. The base station 401 generates precoding weights so that transmission antenna ports #0 and #1 perform the same precoding processing for the mobile terminal 402, and multiplies the transmission data signal to the mobile terminal 402 by the precoding weights to transmit. The base station 401 generates precoding weights so that transmission antenna ports #2 and #3 perform the same precoding processing for the mobile terminal 402, and multiplies the transmission data signal to the mobile terminal 402 by the precoding weights to transmit. Moreover, it is possible to further perform precoding processing such as Cyclic Delay Diversity (CDD) among grouped transmission antennas. In this case, it is preferable that the base station 401 or the mobile terminal 402 considers the precoding processing among grouped transmission antenna ports.

By using the invention as described in Embodiment 1, it is possible to significantly reduce the information amount of feedback information such as the explicit CSI and implicit CSI from the mobile terminal 402 to the base station 401. Further, for example, from the viewpoint of a power amplifier, in the system that signals are output from all transmission antenna ports in the base station 401, it is possible to actualize data transmission from the base station 401 to the mobile terminal 402 without stopping a part thereof.

In addition, in the aforementioned description, the combining processing on the transmission antenna ports or reception antenna ports is described, and is equal to performing combining processing on a respective channel state (channel state estimation value) between each transmission antenna port and each reception antenna port. In addition, in the above-mentioned description, described is the case of using the reference signal for channel state measurement in generating the feedback information, and the mobile terminal may transmit the feedback information generated by using the reference signal for data signal demodulation. For example, it is possible to generate the CQI, RI, CSI or the like using the reference signal for data signal demodulation. In addition, the combining processing may be performed on only a part of antenna ports among the transmission antenna ports and reception antenna ports, or may be performed on all the antenna ports.

Embodiment 2

Embodiment 2 of the present invention will be described below. A communication system in Embodiment is provided with the same configuration as the communication system in Embodiment 1. Therefore, respects different from Embodiment 1 will be described below. In Embodiment 2, in generating the feedback information, the mobile terminal uses a channel state estimation value (frequency response) obtained by performing the combining processing on antenna ports based on the code word. For example, it is possible to perform the combining processing on antenna ports that output the same code word.

Figure 6:
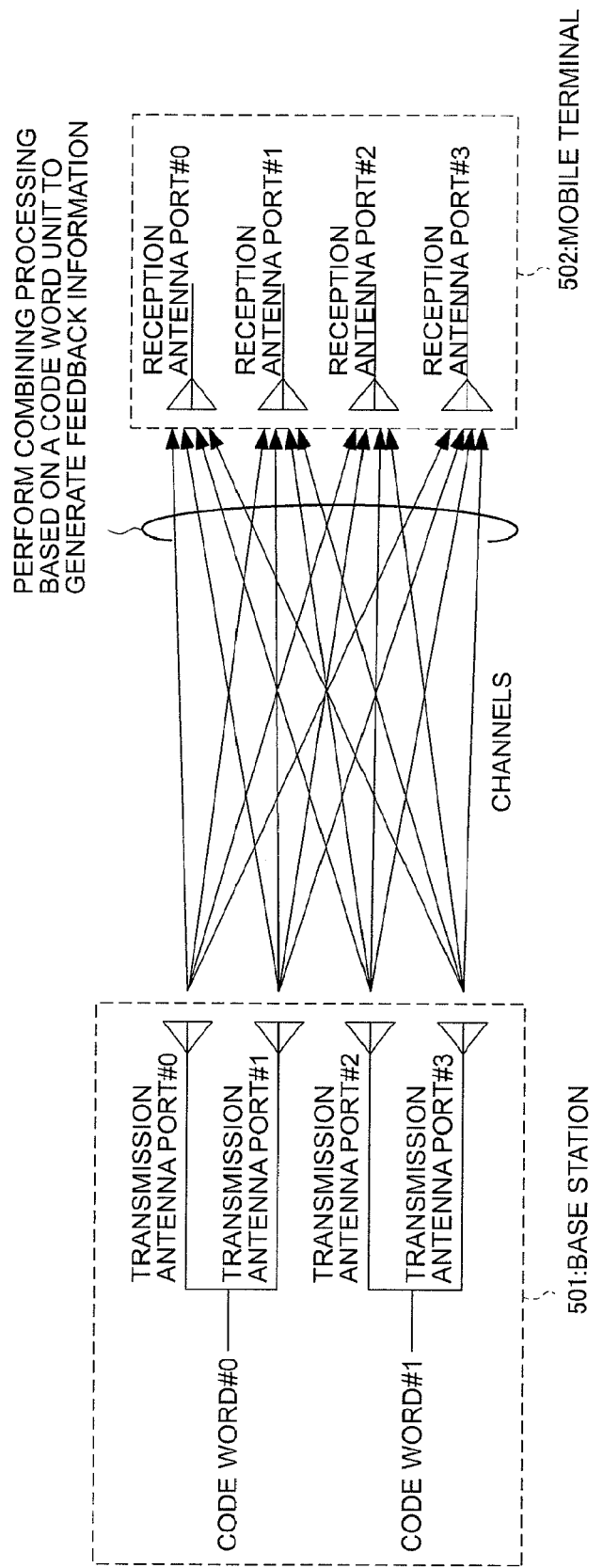
FIG. 6 is a diagram showing a communication system comprised of transmission antenna ports #0 to #3 in a base station 501 and reception antenna ports #0 to #3 in a mobile terminal 502, as an example of Embodiment 2 of the present invention.

FIG. 6 is a diagram showing a communication system comprised of transmission antenna ports #0 to #3 in a base station 501 and reception antenna ports #0 to #3 in a mobile terminal 502, as an example of Embodiment 2 of the present invention. Further, in the base station 501, transmission antenna ports #0 and #1 output code word #0, and transmission antenna ports #2 and #3 output code word #1. At this point, the mobile terminal 502 performs the combining processing on transmission antenna ports #0 and #1, and on transmission antenna ports #2 and #3, and based on the frequency responses, generates the feedback information.

In addition, the mobile terminal may perform the combining processing on only a part of transmission antenna ports, and for example, may perform the combining processing only on transmission antenna ports #0 and #1 that output code word #0. In addition, as described in Embodiment 1, the mobile terminal may further perform the combining processing on frequency responses of at least two beforehand specified reception antenna ports.

Embodiment 3

Embodiment 3 of the present invention will be described below. A communication system in Embodiment is provided with the same configuration as the communication system in Embodiment 1. Therefore, respects different from Embodiment 1 will be described below. In Embodiment 3, in generating the feedback information, the mobile terminal uses a channel state estimation value (frequency response) obtained by performing the combining processing based on the antenna configuration, particularly, performing the combining processing on antenna ports based on the antenna correlation. For example, it is possible to perform the combining processing on antenna ports with a high antenna correlation of the transmission antenna.

Figure 7:
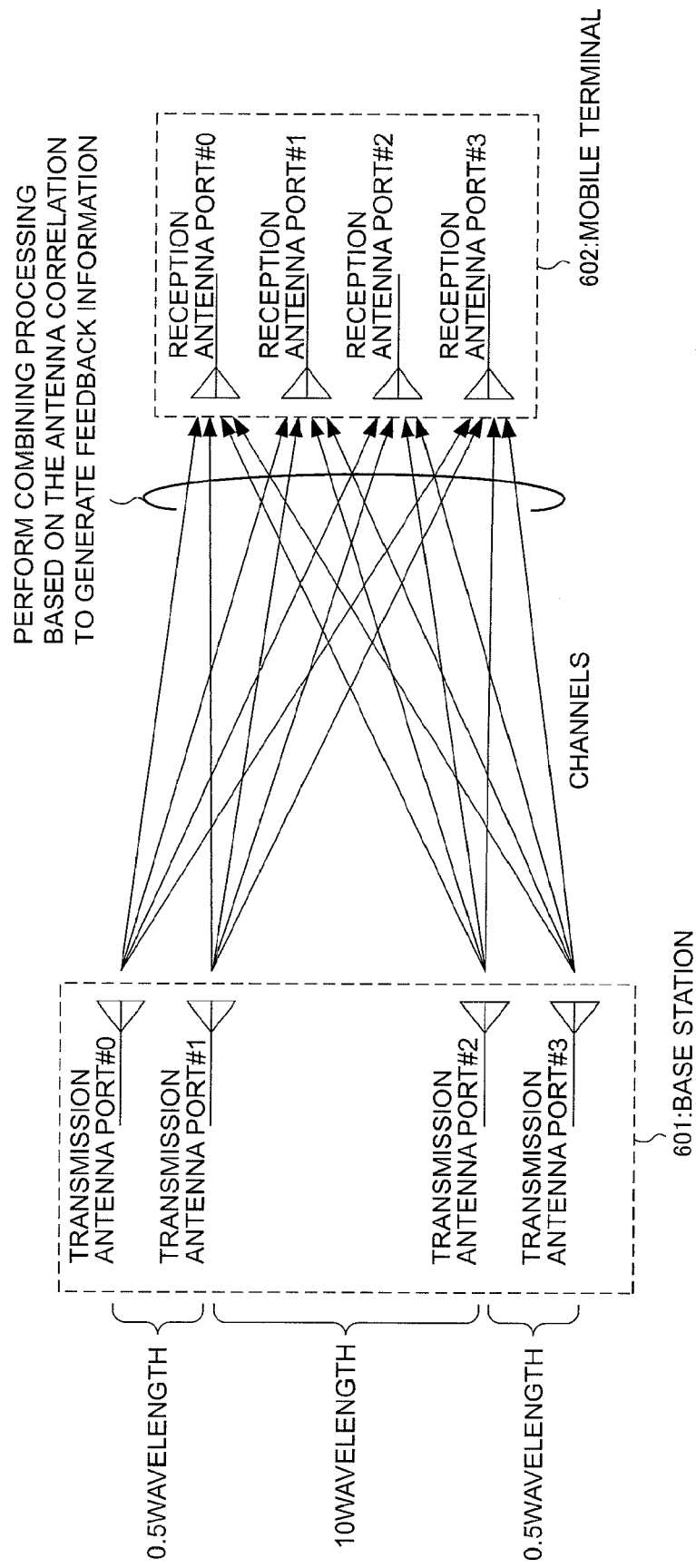
FIG. 7 is a diagram showing a communication system comprised of transmission antenna ports #0 to #3 in a base station 601 and reception antenna ports #0 to #3 in a mobile terminal 602, as an example of Embodiment 3 of the present invention.

FIG. 7 is a diagram showing a communication system comprised of transmission antenna ports #0 to #3 in a base station 601 and reception antenna ports #0 to #3 in a mobile terminal 602, as an example of Embodiment 3 of the present invention. Further, in the base station 601, each of the antenna interval between transmission antenna ports #0 and #1 and the antenna interval between transmission antenna ports #2 and #3 is 0.5 wavelength, resulting in a high antenna correlation, and the antenna interval between transmission antenna ports #1 and #2 is 10 wavelengths, resulting in a low antenna correlation. At this point, the mobile terminal 602 performs the combining processing on transmission antenna ports #0 and #1, and on transmission antenna ports #2 and #3, and based on the frequency responses, generates the feedback information.

In addition, the mobile terminal may perform the combining processing on only a part of transmission antenna ports, and for example, may perform the combining processing only on transmission antenna ports #0 and #1 with the high antenna correlation. In addition, the combining processing may be performed every antenna ports with a low antenna correlation. In addition, as described in Embodiment 1, the mobile terminal may further perform the combining processing on frequency responses of at least two beforehand specified reception antenna ports. Particularly, as described in Embodiment 3, the combining processing may be performed based on the antenna correlation of the reception antenna 301.

Embodiment 4

Embodiment 4 of the present invention will be described below. A communication system in Embodiment is provided with the same configuration as the communication system in Embodiment 1. Therefore, respects different from Embodiment 1 will be described below. In Embodiment 4, in generating the feedback information, the mobile terminal uses a channel state estimation value (frequency response) obtained by performing the combining processing based on the antenna configuration, particularly, performing the combining processing on antenna ports based on antenna polarization in using the cross polarization antenna. For example, it is possible to perform the combining processing on antenna ports with the same antenna polarization of the transmission antenna 208.

Figure 8:
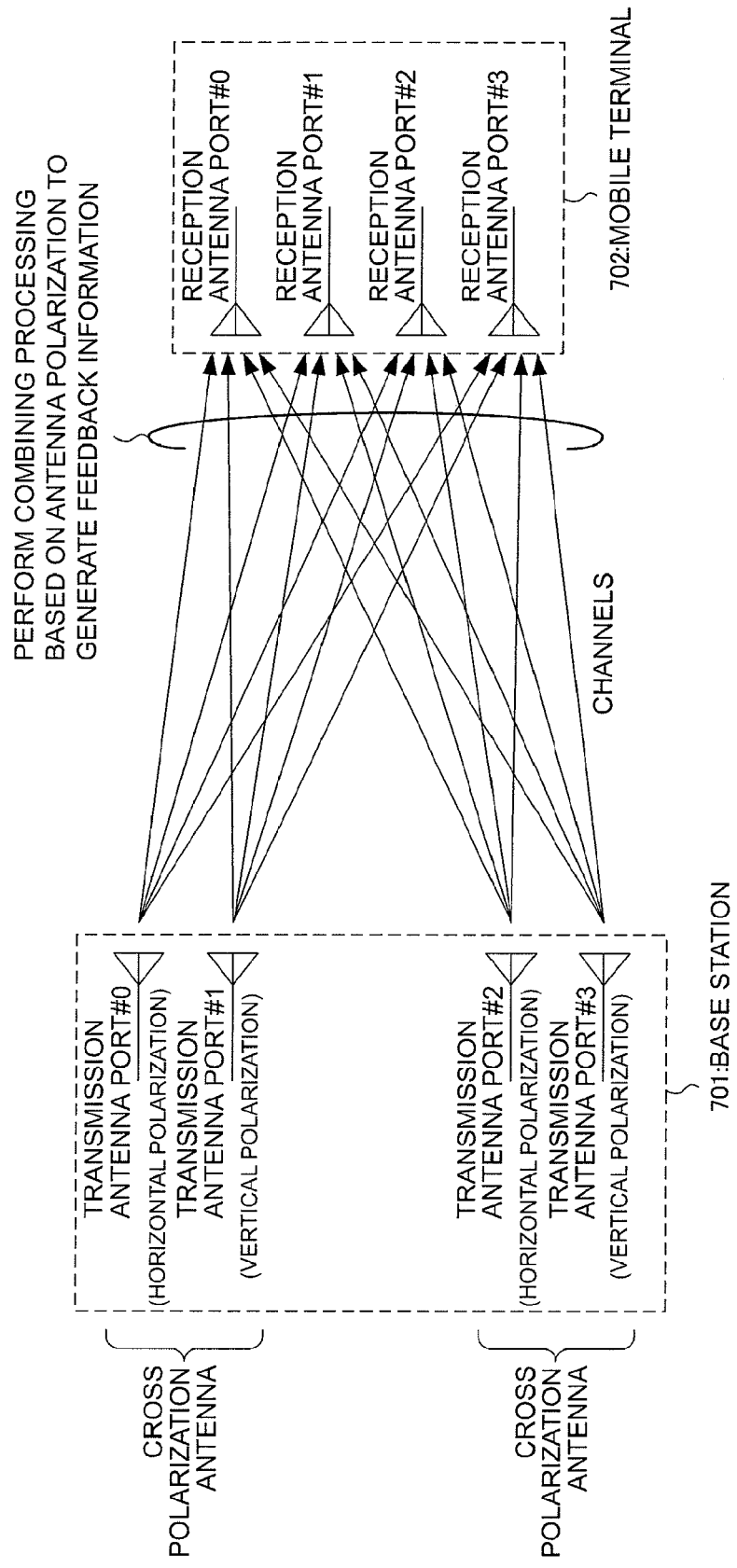
FIG. 8 is a diagram showing a communication system comprised of transmission antenna ports #0 to #3 in a base station 701 and reception antenna ports #0 to #3 in a mobile terminal 702, as an example of Embodiment 4 of the present invention.

FIG. 8 is a diagram showing a communication system comprised of transmission antenna ports #0 to #3 in a base station 701 and reception antenna ports #0 to #3 in a mobile terminal 702, as an example of Embodiment 4 of the invention. Further, in the base station 701, transmission antenna ports #0 and #1 and transmission antenna ports #2 and #3 configure cross polarization antennas. It is assumed that transmission antenna ports #0 and #2 are horizontal polarization, and that transmission antenna ports #1 and #3 are vertical polarization. At this point, the mobile terminal 702 performs the combining processing on transmission antenna ports #0 and #2, and on transmission antenna ports #1 and #3, and based on the frequency responses, generates the feedback information.

In addition, the mobile terminal may perform the combining processing on only a part of transmission antenna ports, and for example, may perform the combining processing only on transmission antenna ports #0 and #2 with the same polarization. In addition, the mobile terminal may perform the combining processing respectively on transmission antenna ports with different polarization, and particularly, may perform the combining processing for each cross polarization antenna. In addition, as described in Embodiment 1, the mobile terminal may further perform the combining processing on frequency responses of at least two beforehand specified reception antenna ports. Particularly, as described in Embodiment 4, the combining processing may be performed based on polarization of the reception antenna 301.

Embodiment 5

Embodiment 5 of the present invention will be described below. A communication system in Embodiment is provided with the same configuration as the communication system in Embodiment 1. Therefore, respects different from Embodiment 1 will be described below. In Embodiment 5, in generating the feedback information, the mobile terminal dynamically selects transmission antenna ports and reception antenna ports to perform the combining processing based on the channel state, and uses a channel state estimation value (frequency response) obtained by performing the combining processing based on the selected antenna ports.

Figure 9:
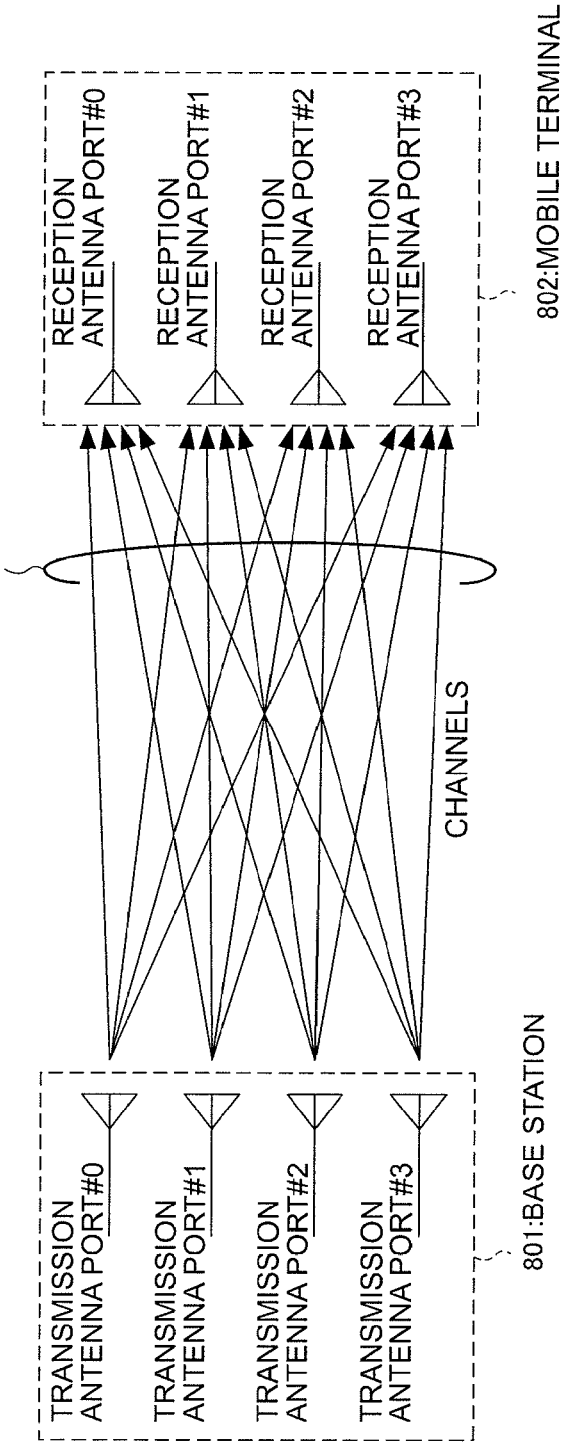
FIG. 9 is a diagram showing a communication system comprised of transmission antenna ports #0 to #3 in a base station 801 and reception antenna ports #0 to #3 in a mobile terminal 802, as an example of Embodiment 5 of the present invention.

FIG. 9 is a diagram showing a communication system comprised of transmission antenna ports #0 to #3 in a base station 801 and reception antenna ports #0 to #3 in a mobile terminal 802, as an example of Embodiment 5 of the present invention. At this point, the mobile terminal 802 selects transmission antenna ports and reception antenna ports to perform the combining processing so that the mobile terminal 802 is capable of performing optimal reception corresponding to the channel state. For example, the mobile terminal performs the combining processing on transmission antenna ports #0 and #3, and on transmission antenna ports #1 and #2, further performs the combining processing on reception antenna ports #0 and #2, and on reception antenna ports #1 and #3, and based on the frequency responses, generates the feedback information. As the feedback information, the mobile terminal further notifies of the port numbers of the transmission antenna ports and reception antenna ports subjected to the combining processing. Furthermore, it is also possible to beforehand define selected and notified port numbers as a plurality of types of patterns (indexes).

In addition, the mobile terminal may perform the combining processing on only a part of antenna ports among the transmission antenna ports or reception antenna ports.

Embodiment 6

Figure 10:
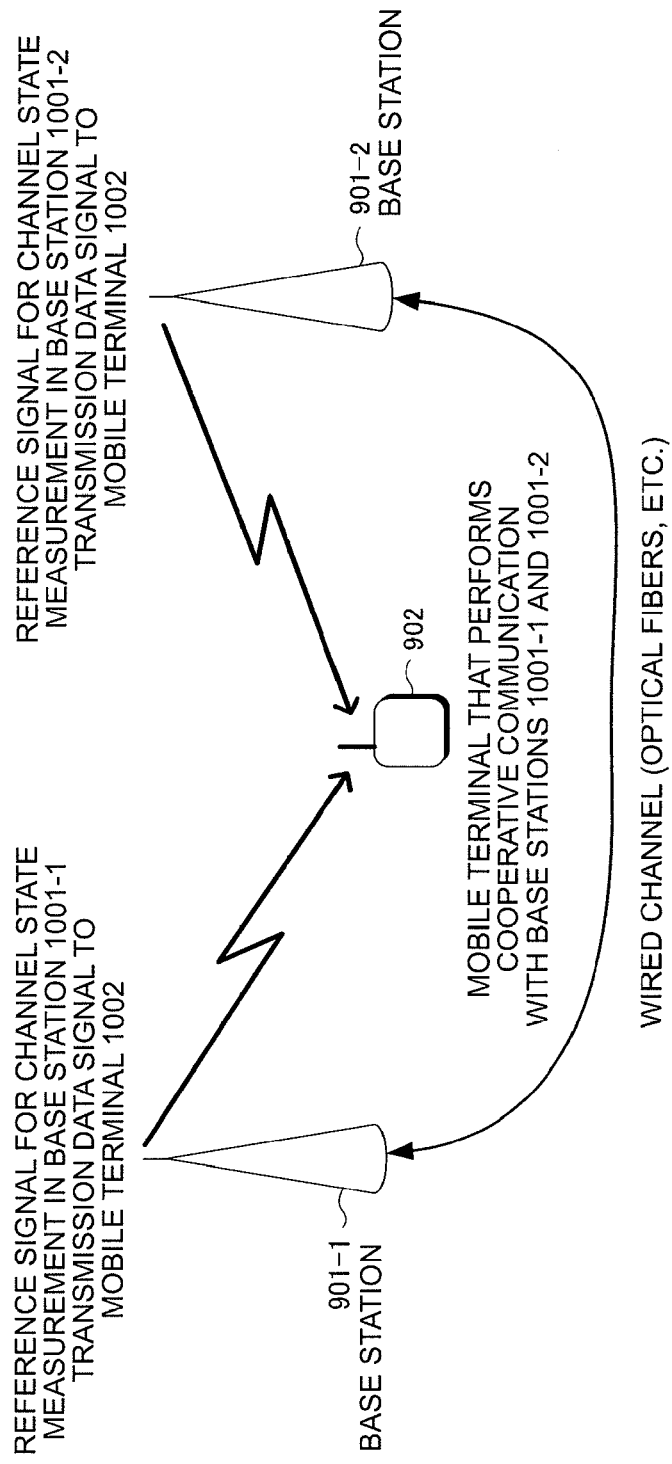
FIG. 10 is a schematic diagram of a wireless communication system according to Embodiment 6 of the present invention.

Embodiment 6 of the present invention will be described below. FIG. 10 is a schematic diagram of a wireless communication system according to Embodiment 6 of the present invention. As shown in FIG. 10, the communication system in Embodiment 6 is provided with at least two base stations 901-1 and 901-2 and mobile terminal 902, and the base stations and mobile terminal respectively have the same configurations as the base station 200 (FIG. 1) and the mobile terminal 300 (FIG. 3) in Embodiment 1. Therefore, respects different from Embodiment 1 will be described below.

In FIG. 10, the base stations 901-1 and 901-2 perform cooperative communication with the mobile terminal 902. To perform cooperative communication, both the base stations 901 are connected with a wired channel (X2 interface) such as optical fibers to share the control information and transmission data signals. In addition, it is also possible to use a wireless channel using relay techniques or the like. Further, the base station 901-1 transmits, to the mobile terminal 902, the reference signal for channel state measurement in the base station 901-1 and the transmission data signal to the mobile terminal 902. The base station 901-2 transmits, to the mobile terminal 902, the reference signal for channel state measurement in the base station 901-2 and the transmission data signal to the mobile terminal 902. These signals are transmitted in cooperative between the base stations 901. By performing such cooperative communication, the mobile terminal 902 positioned between the base stations 901 is capable of greatly reducing the effect of interference between the same channels.

Figure 11:
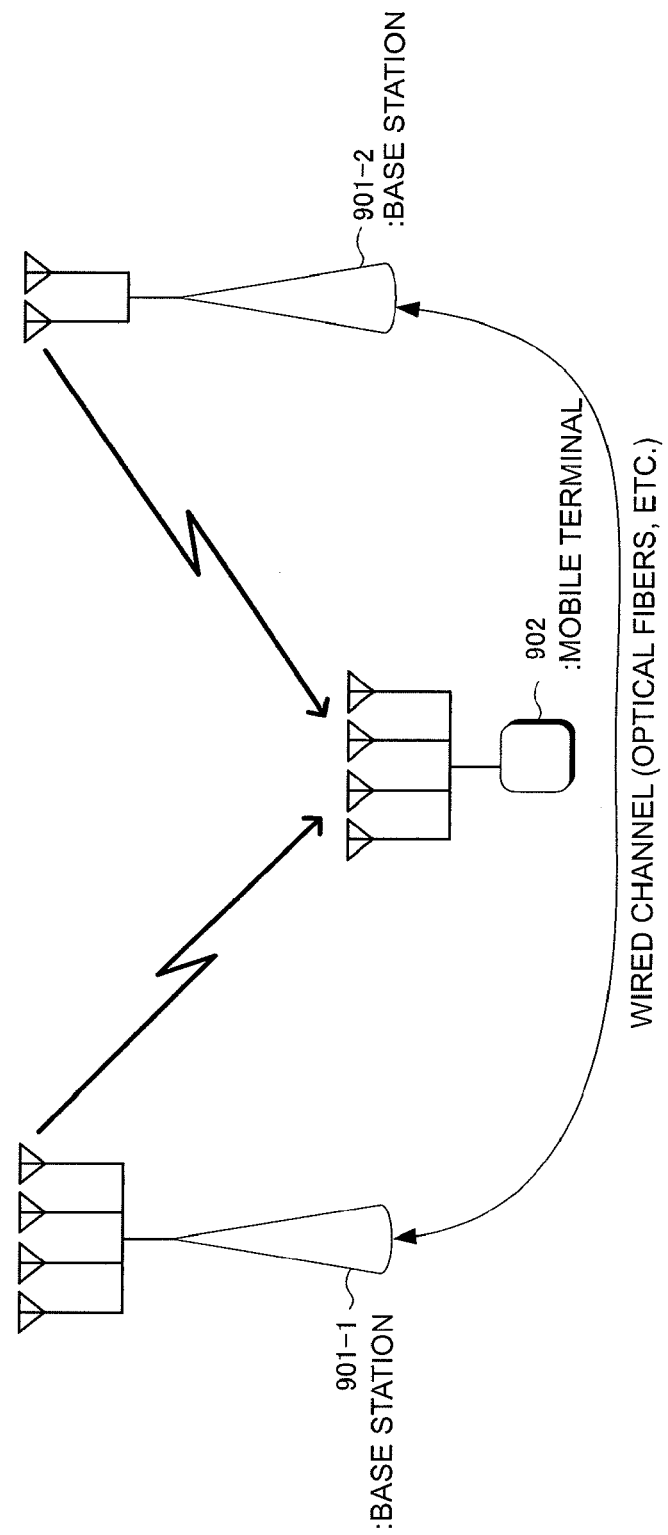
FIG. 11 is a schematic diagram with attention directed toward the numbers of antennas of the wireless communication system according to Embodiment 6 of the present invention.

FIG. 11 is a schematic diagram with attention directed toward the numbers of antennas of the wireless communication system according to Embodiment 6 of the present invention. In the communication system in Embodiment 6, as shown in FIG. 11, the number of transmission antenna ports is different between the base stations 901-1 and 901-2 that perform cooperative communication. For example, it is assumed that the number of transmission antenna ports provided in the base station 901-1 is "4", the number of transmission antenna ports provided in the base station 901-2 is "2", and that the number of transmission antenna ports provided in the mobile station 902 is "4". At this point, in Embodiment 6, in generating the feedback information, the mobile terminal uses a channel state estimation value (frequency response) obtained by performing the combining processing on beforehand specified transmission antenna ports in the base station 901 with the higher number of transmission antenna ports, based on the base station 901 with the lower number of transmission antenna ports.

FIG. 12 is a diagram showing the communication system comprised of transmission antenna ports #1-0 to #1-3 in the base station 901-1, transmission antenna ports #2-0 and #2-1 in the base station 901-2 and reception antenna ports #0 to #3 in the mobile terminal 902, as an example of Embodiment 6 of the present invention. Herein, it is assumed that reference signal for channel state measurements respectively output from transmission antenna ports are independently of one another, and that the mobile terminal 902 is capable of measuring the channel state independently. At this point, with respect to the base station 901-1, the mobile terminal 902 performs the combining processing on transmission antenna ports #1-0 and #1-1, and on transmission antenna ports #1-2 and #1-3, and based on the frequency responses, generates the feedback information. Meanwhile, with respect to the base station 901-2, the mobile terminal does not perform the combining processing, and based on respective frequency responses, generates the feedback information. In addition, the mobile terminal may transmit the feedback information to each of the base stations 901, or may transmit the feedback information to at least one base station 901 (for example, serving base station or anchor base station).

In addition, the mobile terminal may generate the feedback information from a frequency response obtained by performing the combining processing on beforehand specified transmission antenna ports from among all the transmission antenna ports provided in a plurality of base stations 901 that perform cooperative communication. In addition, as described in Embodiment 1, the mobile terminal may further perform the combining processing on frequency responses of at least two reception antenna ports. In addition, the mobile terminal may perform the combining processing on only a part of antenna ports among the transmission antenna ports or reception antenna ports. In addition, the invention in Embodiment 6 is applicable to the communication systems as descried in Embodiments 2 to 5.

Embodiment 7

Embodiment 7 of the present invention will be described below. A communication system in Embodiment is provided with the same configuration as the communication system in Embodiment 1. Therefore, respects different from Embodiment 1 will be described below. In Embodiment 7, in generating the feedback information, the mobile terminal uses a channel state estimation value (frequency response) obtained by performing the combining processing on transmission antenna ports based on the number of spatial multiplexing (rank number, the number of layers). For example, the mobile terminal is capable of performing the combining processing so that the number of feedbacks on transmission antenna ports subjected to the combining processing is the same as the number of spatial multiplexing determined in a base station 1001 or mobile terminal 1002.

FIG. 13 is a diagram showing a communication system comprised of transmission antenna ports #0 to #3 in a base station 1001 and reception antenna ports #0 to #3 in a mobile terminal 1002, as an example of Embodiment of the invention. When the number of spatial multiplexing is "4", the mobile terminal 1002 does not perform the combining processing on transmission antenna ports #0 to #3, and generates the feedback information based on respective frequency responses. When the number of spatial multiplexing is "3", the mobile terminal 1002 performs the combining processing on transmission antenna ports #0 and #1, does not perform the combining processing on transmission antenna ports #2 and #3, and generates the feedback information based on respective frequency responses. When the number of spatial multiplexing is "2", the mobile terminal 1002 performs the combining processing on transmission antenna ports #0 and #1 and on transmission antenna ports #2 and #3, and generates the feedback information based on respective frequency responses. When the number of spatial multiplexing is "1", the mobile terminal 1002 performs the combining processing on transmission antenna ports #0 to #3, and generates the feedback information based on the frequency response.

In addition, in the aforementioned description, the case is described where the mobile terminal performs the combining processing so that the number of feedbacks on transmission antenna ports subjected to the combining processing is the same as the number of spatial multiplexing determined in the base station 1001 or mobile terminal 1002, but it is only essential that antenna ports to perform the combining processing are determined based on the number of spatial multiplexing, and the invention is not limited thereto. In addition, as described in Embodiment 1, the mobile terminal may further perform the combining processing on frequency responses of at least two reception antenna ports. In addition, the invention in Embodiment 7 is applicable to the communication systems as descried in Embodiments 2 to 6.

Embodiment 8

Embodiment 8 of the present invention will be described below. A communication system in Embodiment is provided with the same configuration as the communication system in Embodiment 1. Therefore, respects different from Embodiment 1 will be described below. In Embodiment 8, in generating the feedback information, the mobile terminal uses a channel state estimation value (frequency response) obtained by performing the combining processing on beforehand specified antenna ports, where a plurality of types of patterns of antenna ports (code books) to perform the combining processing is beforehand defined, and is switched (selected) according to timing to perform feedback.

FIG. 14 shows an example of Embodiment 8 of the present invention where N types of patterns to perform the combining processing are beforehand defined and a mobile terminal 1102 performs the combining processing by any one of N types of combining patterns to perform feedback to a base station 1101. For example, as shown in FIG. 5, considered is a communication system comprised of transmission antenna ports #0 to #3 in the base station 1101 and reception antenna ports #0 to #3 in the mobile terminal 1102. Further, three types of combining patterns, 1 to 3, are assumed. In the first combining pattern, the mobile terminal 1102 performs the combining processing on transmission antenna ports #0 and #1 and on transmission antenna ports #2 and #3, and generates the feedback information based on respective frequency responses. In the second combining pattern, the mobile terminal 1102 performs the combining processing on transmission antenna ports #0 and #2 and on transmission antenna ports #1 and #3, and generates the feedback information based on respective frequency responses. In the third combining pattern, the mobile terminal 1102 performs the combining processing on transmission antenna ports #0 and #3 and on transmission antenna ports #1 and #2, and generates the feedback information based on respective frequency responses.

In addition, as the combining patterns, it is possible to define the patterns for the reception antenna ports, and to define the patterns for both the transmission antenna ports and the reception antenna ports. The mobile terminal 1102 switches to either of the combining patterns corresponding to timing to perform feedback. At this point, it is possible to beforehand define the combining patterns to use corresponding to the number of feedback times, or the like. In addition, the base station may designate the combining pattern to use. Alternatively, the mobile terminal may select the combining pattern to use based on the channel state or the like, and it is preferable that the mobile station further transmits the information indicative of the used combining pattern as feedback. By this means, the mobile terminal is capable of dynamically performing the combining processing, and it is possible to actualize excellent characteristics. In addition, it is possible to define the combining patterns to use based on parameters in the time domain (subframe number, slot number, radio frame number, etc.) to perform feedback (or, instructed to perform feedback). By this means, the need is eliminated for notifying or feeding back the information concerning the combining pattern to use, and it is possible to reduce overhead concerning the information.

In addition, in the aforementioned description, switching of combining patterns is based on timing (the parameter in the time domain) to perform feedback, but the invention is not limited thereto. For example, the combining patterns may be switched based on parameters in the frequency domain (including subcarrier, resource block, sub-band, component carrier, etc.). Further, switching may be made by parameters with respect to the base station 1101, and for example, switching may be made between adjacent base stations 1101, may be made according to the configuration of the base station 1101, or may be made between base stations 1101 that perform cooperative communication. Furthermore, switching may be made by parameters with respect to the mobile terminal 1102. Still furthermore, the factors may be combined. In addition, the invention in Embodiment 8 is applicable to the communication systems as described in Embodiments 2 to 7.

DESCRIPTION OF SYMBOLS 100, 200, 401, 501, 601, 701, 801, 901-1, 901-2, 1001, 1101 Base station
103 Transmission antenna
110, 300, 402, 502, 602, 702, 802, 902, 1002, 1102 Mobile terminal
111, 210, 301 Reception antenna
113 Feedback information generation part
209 Reference signal for channel state measurement generation part
310 Feedback information generation part
3102 Grouping part

The invention claimed is:

1. A mobile terminal configured to communicate with a base station having a plurality of transmission antenna ports, the mobile terminal comprising:
feedback information generation circuitry configured to generate feedback information based on a plurality of reference signals for channel state measurement, wherein
each of the plurality of reference signals is transmitted using different ones of the plurality of transmission antenna ports,
the plurality of reference signals are orthogonalized,
the feedback information includes information indicating a precoding matrix that is selected by the mobile terminal from a plurality of precoding matrices, the plurality of precoding matrices being predefined,
each of the plurality of precoding matrices includes a plurality of rows, the plurality of rows each corresponding to one of the plurality of transmission antenna ports, the plurality of rows and corresponding ones of the plurality of transmission antenna ports being grouped into a plurality of groups, and each of the plurality of groups including at least two rows of the plurality of rows, and
each of the plurality of rows in each of the plurality of precoding matrices includes at least one element defined by a first precoding and a second precoding, the first precoding being identically defined in each of the plurality of groups, and the second precoding being differently defined in each of the plurality of groups.

2. The mobile terminal according to claim 1, wherein the feedback information generation circuitry is configured to generate a CQI that is information corresponding to a coding rate and a modulation scheme such that a reception quality assuming the precoding matrix that is selected from among the plurality of precoding matrices meets a required quality.

3. The mobile terminal according to claim 1, wherein the grouping is performed based on a parameter of the base station.

4. The mobile terminal according to claim 1, wherein the grouping is performed based on a parameter of the mobile terminal.

5. The mobile terminal according to claim 1, wherein the grouping is performed based on a parameter of a component carrier.

6. A communication system comprising:
a base station having a plurality of transmission antenna ports; and
a mobile terminal, wherein
the base station and the mobile terminal are configured to communicate with each other,
the base station comprises reference signal for channel state measurement generation circuitry configured to generate a plurality of reference signals for channel state measurement which are mutually known between the base station and the mobile terminal,
the mobile terminal comprises feedback information generation circuitry configured to generate feedback information based on the plurality of reference signals for channel state measurement,
each of the plurality of reference signals is transmitted using different ones of the plurality of transmission antenna ports,
the plurality of reference signals are orthogonalized,
the feedback information includes information indicating a precoding matrix that is selected by the mobile terminal from a plurality of precoding matrices, the plurality of precoding matrices being predefined,
each of the plurality of precoding matrices includes a plurality of rows, the plurality of rows each corresponding to one of the plurality of transmission antenna ports, the plurality of rows and corresponding ones of the plurality of transmission antenna ports being grouped into a plurality of groups, and each of the plurality of groups including at least two rows of the plurality of rows, and
each of the plurality of rows in each of the plurality of precoding matrices includes at least one element defined by a first precoding and a second precoding, the first precoding being identically defined in each of the plurality of groups, and the second precoding being differently defined in each of the plurality of groups.

7. The communication system according to claim 6, wherein
the feedback information generation circuitry is configured to generate a CQI that is information corresponding to a coding rate and a modulation scheme such that a reception quality assuming the precoding matrix that is selected from among the plurality of precoding matrices meets a required quality.

8. A base station having a plurality of transmission antenna ports configured to communicate with a mobile terminal, the base station comprising:
reference signal for channel state measurement generation circuitry configured to generate a plurality of reference signals for channel state measurement which are mutually known between the base station and the mobile terminal;
reception circuitry configured to receive feedback information corresponding to a precoding matrix that is selected from a plurality of precoding matrices the feedback information being based on the plurality of reference signals, and the plurality of precoding matrices being predefined; and
precoding circuitry configured to perform precoding processing for the mobile terminal based on the feedback information, wherein
each of the plurality of reference signals is transmitted using different ones of the plurality of transmission antenna ports,
the plurality of reference signals are orthogonalized,
the feedback information includes information indicating a precoding matrix that is selected by the mobile terminal from a plurality of precoding matrices, the plurality of precoding matrices being predefined, each of the plurality of precoding matrices includes a plurality of rows, the plurality of rows each corresponding to one of the plurality of transmission antenna ports, the plurality of rows and corresponding ones of the plurality of transmission antenna ports being grouped into a plurality of groups, and each of the plurality of groups including at least two rows of the plurality of rows, and each of the plurality of rows in each of the plurality of precoding matrices includes at least one element defined by a first precoding and a second precoding, the first precoding being identically defined in each of the plurality of groups, and the second precoding being differently defined in each of the plurality of groups.

9. The base station according to claim 8, further comprising:

reception circuitry configured to receive a CQI;

coding circuitry configured to control a coding rate for the mobile terminal based on the CQI; and modulation circuitry configured to control a modulation scheme for the mobile terminal based on the CQI, wherein the CQI is information corresponding to the coding rate and the modulation scheme such that a reception quality assuming the precoding matrix that is selected from among the plurality of precoding matrices meets a required quality.

10. A wireless communication method performed by a mobile terminal which is configured to communicate with a base station having a plurality of transmission antenna ports, the wireless communication method comprising:

generating feedback information based on a plurality of reference signals for channel state measurement, wherein each of the plurality of reference signals is transmitted using different ones of the plurality of transmission antenna ports, the plurality of reference signals are orthogonalized, the feedback information includes information indicating a precoding matrix that is selected by the mobile terminal from a plurality of precoding matrices, the plurality of precoding matrices being predefined, each of the plurality of precoding matrices includes a plurality of rows, the plurality of rows each corresponding to one of the plurality of transmission antenna ports, the plurality of rows and corresponding ones of the plurality of transmission antenna ports being grouped into a plurality of groups, and each of the plurality of groups including at least two rows of the plurality of rows, and each of the plurality of rows in each of the plurality of precoding matrices includes at least one element defined by a first precoding and a second precoding, the first precoding being identically defined in each of the plurality of groups, and the second precoding being differently defined in each of the plurality of groups.

11. The wireless communication method according to claim 10 further comprising:

generating a CQI that is information corresponding to a coding rate and a modulation scheme such that a reception quality assuming the precoding matrix that is selected from among the plurality of precoding matrices meets a required quality.

12. A wireless communication method performed by a base station having a plurality of transmission antenna ports configured to communicate with a mobile terminal, the wireless communication method comprising:

generating a plurality of reference signals for channel state measurement which are mutually known between the base station and the mobile terminal;

receiving feedback information corresponding to a precoding matrix that is selected from a plurality of precoding matrices, the feedback information being based on the plurality of reference signals, and the plurality of precoding matrices being predefined; and performing precoding processing for the mobile terminal based on the feedback information, wherein each of the plurality of reference signals is transmitted using different ones of the plurality of transmission antenna ports, the plurality of reference signals are orthogonalized, the feedback information includes information indicating a precoding matrix that is selected by the mobile terminal from a plurality of precoding matrices, the plurality of precoding matrices being predefined, each of the plurality of precoding matrices includes a plurality of rows, the plurality of rows each corresponding to one of the plurality of transmission antenna ports, the plurality of rows and corresponding ones of the plurality of transmission antenna ports being grouped into a plurality of groups, and each of the plurality of groups including at least two rows of the plurality of rows, and each of the plurality of rows in each of the plurality of precoding matrices includes at least one element defined by a first precoding and a second precoding, the first precoding being identically defined in each of the plurality of groups, and the second precoding being differently defined in each of the plurality of groups.

13. The wireless communication method according to claim 12 further comprising:

receiving a CQI;

controlling a coding rate for the mobile terminal based on the CQI; and controlling a modulation scheme for the mobile terminal based on the CQI, wherein the CQI is information corresponding to the coding rate and the modulation scheme such that a reception quality assuming the precoding matrix that is selected from among the plurality of precoding matrices meets a required quality.

* * * * *